(12) United States Patent
Jasmin et al.

(10) Patent No.: US 11,770,097 B1
(45) Date of Patent: Sep. 26, 2023

(54) RAIL-ATTACHED BOTTOM CLAMP FOR SOLAR PANELS SECURED TO ROOFS AND BUILDING STRUCTURES

(71) Applicant: Sunmodo Corporation, Vancouver, WA (US)

(72) Inventors: Roland Jasmin, Portland, OR (US); Steve Mumma, Oregon City, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/121,933

(22) Filed: Mar. 15, 2023

(51) Int. Cl.
*H02S 20/23* (2014.01)
*F16B 2/24* (2006.01)

(52) U.S. Cl.
CPC .............. *H02S 20/23* (2014.12); *F16B 2/241* (2013.01)

(58) Field of Classification Search
None
See application file for complete search history.

(56) References Cited

U.S. PATENT DOCUMENTS

| | | | |
|---|---|---|---|
| 8,590,223 B2 | 11/2013 | Kilgore et al. | |
| 9,175,881 B2 | 11/2015 | Schrock et al. | |
| 9,331,629 B2 | 5/2016 | Cheung et al. | |
| 9,705,447 B2 | 7/2017 | Cavieres et al. | |
| 9,893,677 B1 | 2/2018 | Liu | |
| 9,923,511 B2* | 3/2018 | Xie | H02S 30/10 |
| 10,211,774 B2 | 2/2019 | Zhu | |
| 10,305,416 B2 | 5/2019 | Zhu | |
| 10,622,935 B1 | 4/2020 | Liu | |
| 10,648,698 B2* | 5/2020 | Itou | F24S 25/632 |
| 10,801,538 B2 | 10/2020 | Egall et al. | |
| 10,847,960 B1* | 11/2020 | Naugler | H01R 4/64 |
| 10,852,038 B2 | 12/2020 | Rothschild | |
| 2011/0253859 A1 | 10/2011 | Ostermeirer et al. | |
| 2013/0091786 A1 | 4/2013 | DuPont et al. | |
| 2013/0102165 A1 | 4/2013 | DuPont | |
| 2016/0282018 A1* | 9/2016 | Ash | F24S 25/636 |
| 2019/0312546 A1* | 10/2019 | Legall | H02S 20/10 |
| 2021/0194410 A1* | 6/2021 | Yang | H02S 20/23 |
| 2022/0294386 A1* | 9/2022 | Creasy | H02S 20/32 |

FOREIGN PATENT DOCUMENTS

| | | |
|---|---|---|
| CN | 203367303 U | 12/2013 |
| CN | 204498061 U | 7/2015 |
| DE | 102010022556 B3 | 6/2011 |
| DE | 102012007535 A1 | 10/2013 |
| WO | 2017138747 A1 | 8/2017 |

* cited by examiner

*Primary Examiner* — Steven M Marsh
(74) *Attorney, Agent, or Firm* — Stone Creek Services LLC; Alan M Flum

(57) ABSTRACT

A device, system, and method for mounting solar PV panels to rails. The device can include a bottom clamp that secures the solar PV panel to the rail by creating tension between the return flange of the solar panel frame and the rail. The bottom clamp can be structured to snap onto the rail sides. Mid-clamp versions of the bottom clamp can be so structured that the solar PV panel and bottom clamps can be removed by prying the opposing sides of the bottom clamp from above the solar PV panels.

20 Claims, 32 Drawing Sheets

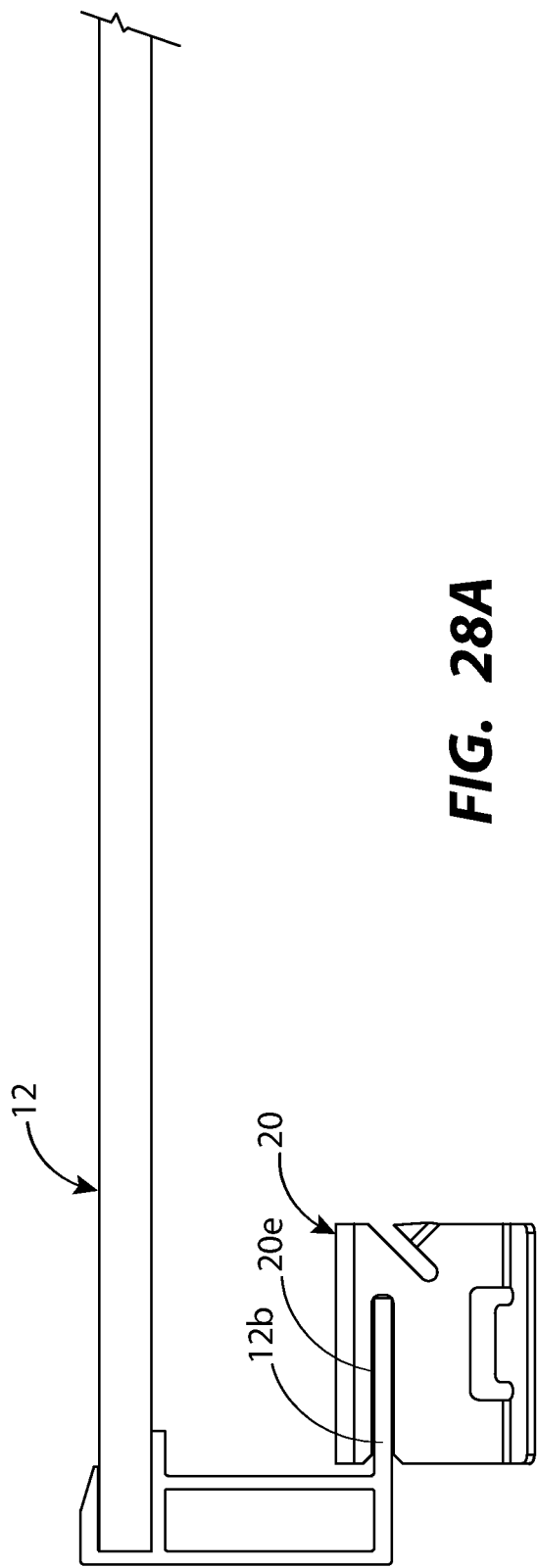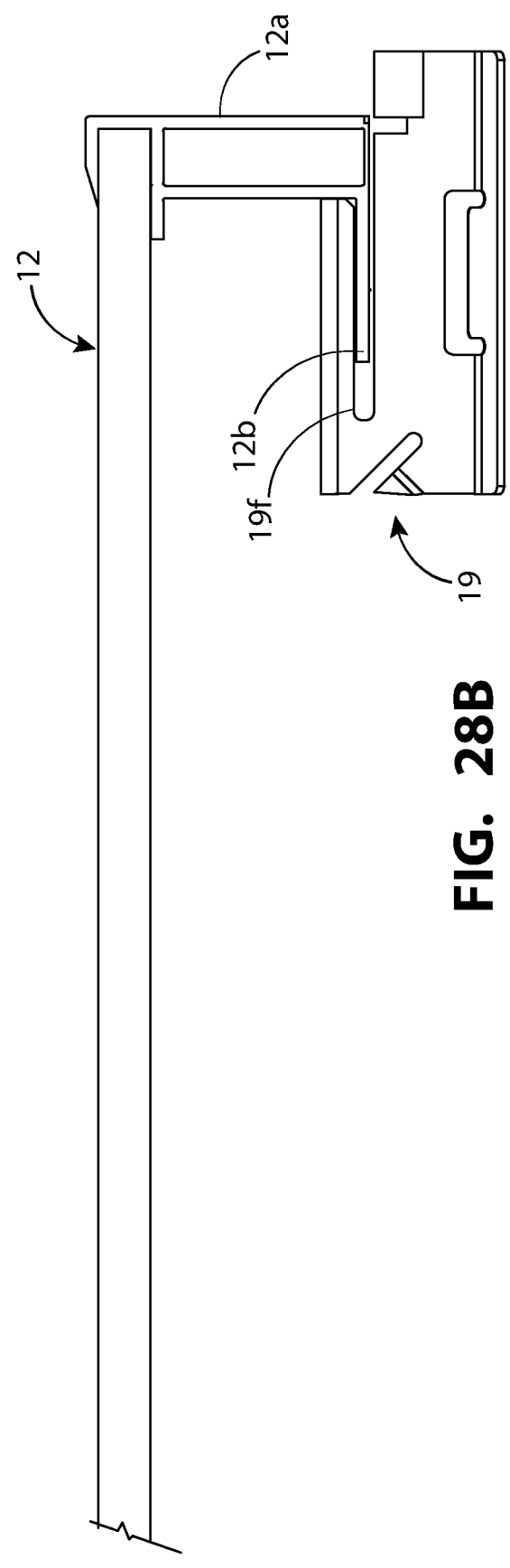
FIG. 28A
FIG. 28B

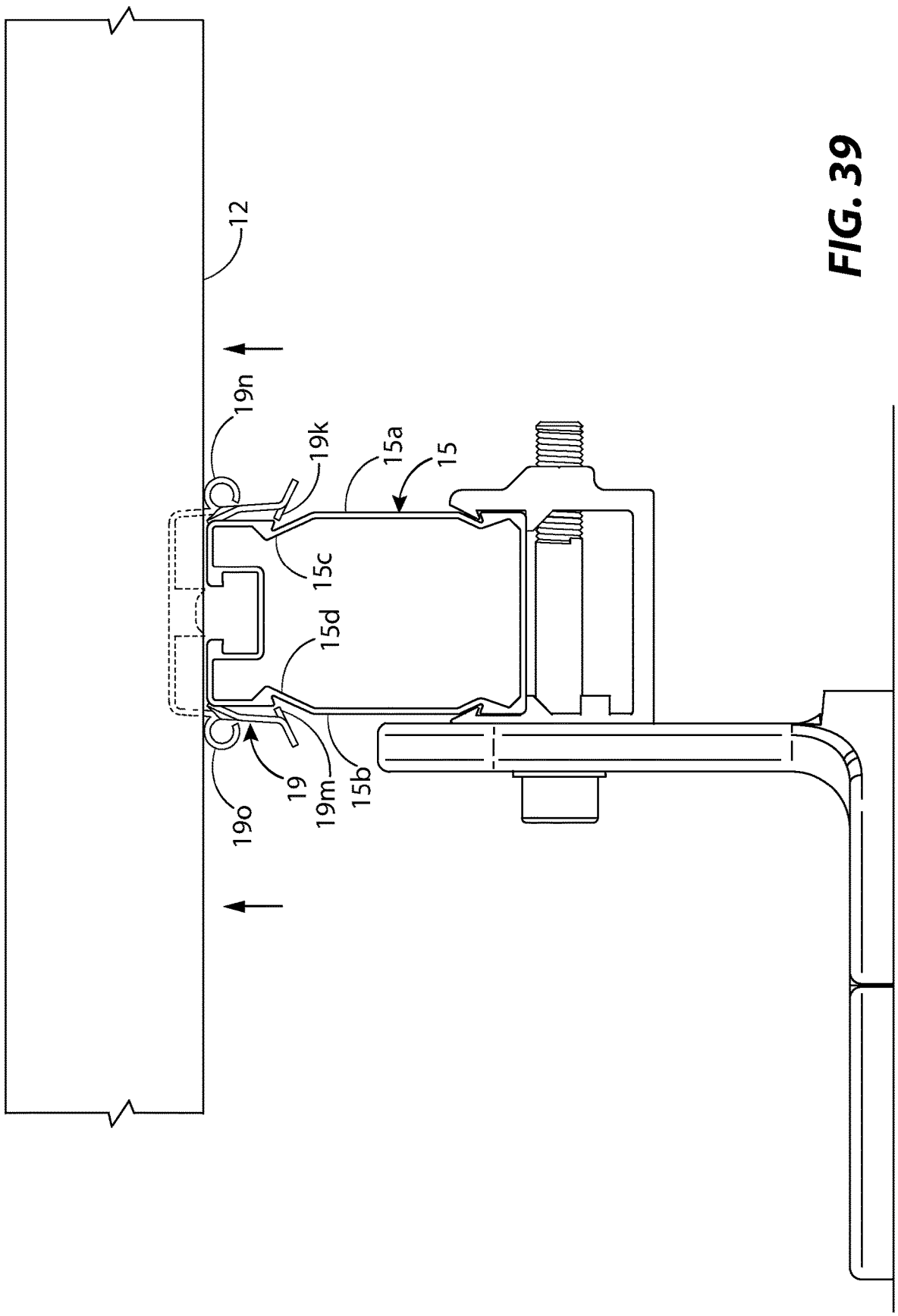

RAIL-ATTACHED BOTTOM CLAMP FOR SOLAR PANELS SECURED TO ROOFS AND BUILDING STRUCTURES

BACKGROUND

The present disclosure relates to solar panel mounting systems as well as devices, systems, and methods relating to mounting solar panels to roofs and building structures.

Solar photovoltaic (PV) systems are used in commercial, residential, and utility-scale environments. For example, solar PV panel installations can be found on various types of residential and commercial roofs, shade structures (e.g., awnings and carports), as well as building facades. In addition, solar PV panels can be installed on self-supporting ground-mounted structures, typically in commercial and utility-scale environments.

Solar PV systems are placed and secured within residential, commercial, and utility-scale environments by solar panel mounting systems, also known as "solar panel racking systems." In some solar panel mounting systems, the solar PV panels are secured to rails that run under the solar PV panels.

Typically, solar PV panels can be secured to rails by over-the-panel clamps. Over-the-panel clamps use a mounting bracket that creates clamping pressure between the top of the solar panel frame and the rail. Over-the-panel end clamps clamp portions of the outside perimeter of a solar PV panel to a rail. Over-the-panel mid clamps clamp directly adjacent solar PV panels to a rail. Portions of over-the-panel mid clamps and over-the-panel end clamps are visible from the top of the solar panel frame which can be undesirable.

Solar PV panels can also be secured to rails by under-the-panel clamps. Under-the-panel clamps, also known as "solar panel bottom clamps" or just "bottom clamps," secure and clamp the underside of the solar PV panel frame lip, or "return flange" to the rail. Bottom clamps can create a cleaner appearance as compared with over-the-panel clamps because the bottom clamp does not extend over the top of the solar panel frame and much of it is hidden from view.

SUMMARY

The inventors noted several challenges faced by solar panel system installers when installing bottom clamps. These challenges include high material costs, complexity of installation, and servicing. The inventors set out to develop a new bottom clamp and system utilizing the new bottom clamp that addresses these challenges.

The inventors developed a device and system that includes a bottom clamp that is simple to fabricate, typically out of a single piece of sheet metal, thereby lowering material costs. The bottom clamp does not require threaded fasteners, pivots, or other additional components that add cost and complexity. The bottom clamp includes a top and sides projecting downward from opposite sides of the top. The sides can project perpendicularly downward from the top to optimize engagement with substantially rectangular rails. However, depending on the construction of the rail, the sides could project downward from the top at other angles.

The top can include an upper tab that projects obliquely downward from the top. Each side of the bottom clamp can include a slot extending lengthwise. The slots are sized and positioned to receive the return flange of the solar PV panel and align the return flange to engage the upper tab. The upper tab is sized and positioned to engage the top of the return flange under tension. Typically, the upper tab would be sized so the bottom of the upper tab would be positioned at or slightly below the plane that runs through the slots. The upper tab would then engage the return flange under tension because the return flange is positioned through the plane of the slots. The upper tab extends obliquely downward and is angled obliquely away from the slot opening making the bottom clamp difficult to remove because of spring tension and thereby locking it into place.

Each side of the bottom clamp can include a flange extending outward. Tabs can extend inward from a corresponding flange allowing the bottom clamp to snap onto the sides of a rail from above. The rail typically includes structures that prevents the tabs, and therefore, the bottom clamp, from moving upward. For example, detented side portions that extend lengthwise along each rail side and include a downward-angled portion can prevent upward movement of the tab. Optionally, rail slots extending lengthwise along each rail side can alternatively prevent upward movement of the tab.

The combination of slots, tabs, and upper tab, as described, allows a set of bottom clamps to be preassembled to the solar PV panels. In addition, the bottom clamps can be structured so that the solar PV panels, via the bottom clamps, can be snapped onto the rails and secured to the solar panel mounting system without the use of tools. This can significantly simplify installation and reduce labor costs.

A mid-clamp version of the bottom clamp can be so structured as to allow removal by placing pressure on or prying the sides of the bottom clamps from above or below the solar PV panels. Because the bottom clamps can be dissembled from above the solar PV panels, the mid-clamp versions of the bottom clamps can be used in situations where there is no bottom access; for example, roof top mounted solar panels.

This Summary introduced a selection of concepts in simplified form that are described in more detail in the Description. The Summary is not intended to limit the scope of the claims.

BRIEF DESCRIPTION OF THE DRAWINGS

FIG. 28A illustrates, a left-hand portion of the solar PV panel and bottom clamp assembly with a portion of the solar PV panel cutaway to reveal the bottom clamp of FIG. 7.

FIG. 28B illustrates, a right-hand portion of the solar PV panel and bottom clamp assembly with a portion of the solar PV panel cutaway to reveal the bottom clamp of FIG. 3.

FIG. 39 illustrates, in side view, the solar PV panel, mid-clamp version of the bottom clamp, and the rail assembly attached to the roof where the bottom clamp is pried away from the rail to allow the solar PV panel to be removed from the rail.

DESCRIPTION

When describing the figures, the terms "top," "bottom," "front," "rear," and "side," are from the perspective of a person standing in front of a solar PV system. Specific dimensions are intended to help the reader understand the scale and advantage of the disclosed material. Dimensions given are typical and the claims are not limited to the recited dimensions. Ordinals such as "first," "second," or "third," are used to in this Description and in the Claims to differentiate similarly-named parts and does not imply a particular order, preference, or importance. For the purpose of this disclosure, multiple instances of equivalent parts are differentiated by a "prime" symbol for clarity when discussing the parts. For example, in FIG. 2, multiple instances of L-bracket mounting assembly 17 are differentiated as L-bracket mounting assembly 17, L-bracket mounting assembly 17', and L-bracket mounting assembly 17".

Figure 1:
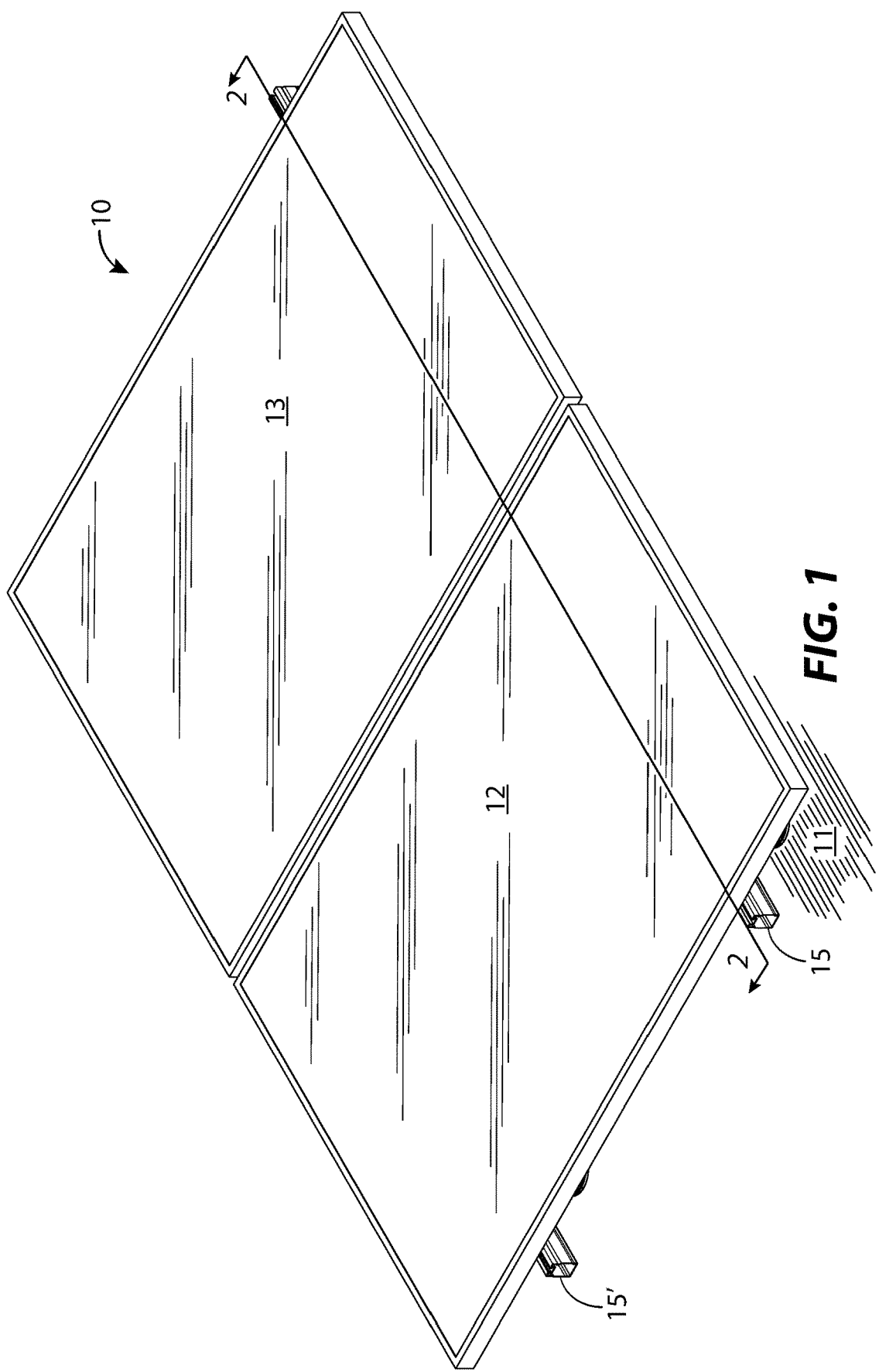
FIG. 1 illustrates, in top isometric view, a solar PV assembly mounted to a roof and utilizing rails and bottom clamps, illustrating that the bottom clamps are hidden from view.
Figure 2:
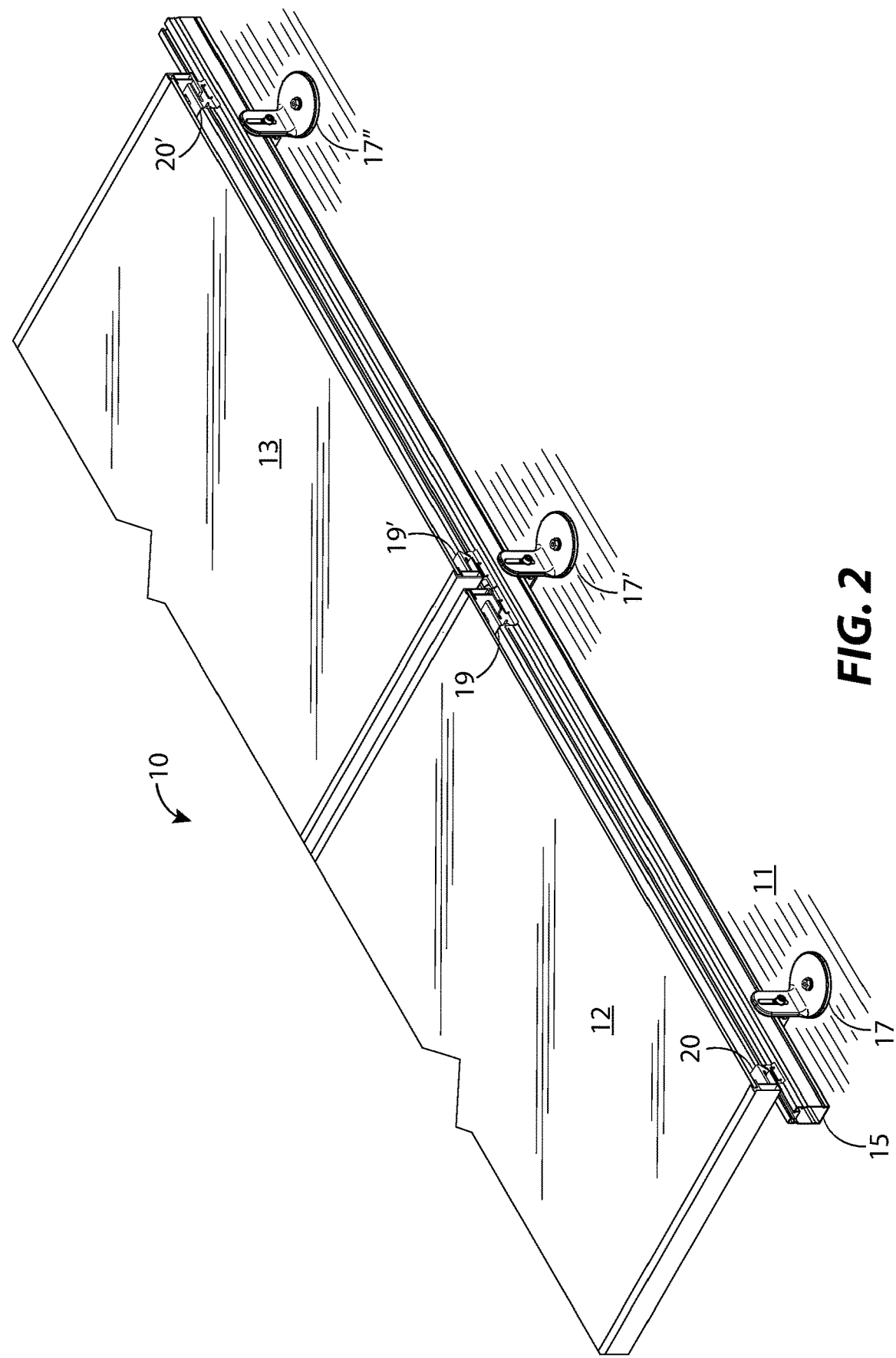
FIG. 2 illustrates, in top isometric view, a portion of FIG. 1 where the front of the solar PV panels is cutaway along section lines 2-2 in FIG. 1 to reveal bottom clamps and the interior structure of the solar PV panel frame.

FIG. 1 illustrates a solar PV system 10 installed on a roof 11. The solar PV system 10 can include solar PV panels 12, 13, and rails 15, 15'. Referring to FIG. 2, in addition to the solar PV panels 12, 13, and rail 15, illustrated, the solar PV system 10 can also include a mounting assembly, such as the L-bracket mounting assembly 17, 17', 17" for mounting the rail 15 to the roof 11.

Referring to FIG. 1, the solar PV panels 12, 13 are held to the rails 15, 15' by bottom clamps. The bottom clamps are hidden from view in FIG. 1. Referring to FIG. 2, the front widthwise portions of solar PV panels 12, 13 is cutaway along section line 2-2 in FIG. 1 to reveal bottom clamps 19, 19', 20, 20'. Bottom clamps 20, 20' is an end-clamp and is illustrated at the outside perimeter of the solar PV panels 12, 13, respectively. Bottom clamps 19, 19' are mid-clamp and are positioned on the return flange of the solar PV panels 12, 13, respectively.

As discussed in the Summary, the inventors set out to create devices, systems, and methods to address several challenges faced by solar panel system installers. These challenges include high material costs, complexity of installation, and servicing.

Referring to FIGS. 3-10, the mid-clamp version of a bottom clamp 19 (FIGS. 3-6) and the end-clamp version of the bottom clamp 20 (FIGS. 7-10) reduce material costs, reduce installation complexity, and simplify servicing. The bottom clamps 19, 20, as illustrated, can be fabricated out of a single piece of sheet metal thereby lowering material costs. The bottom clamps 19, 20 do not require threaded fasteners, pivots, or other additional components that add cost and complexity.

The combination of slots, tabs, and upper tab as will be described in FIGS. 3-6 and in FIGS. 7-10, allows the bottom clamps to be preassembled to the solar PV panels, the bottom clamps to be snapped onto the outside of the rails, and the solar PV panels to be secured to the rails without the use of any tools. This will be discussed in more detail for FIGS. 27-33. This can significantly simplify installation and reduce labor costs.

Figure 35:
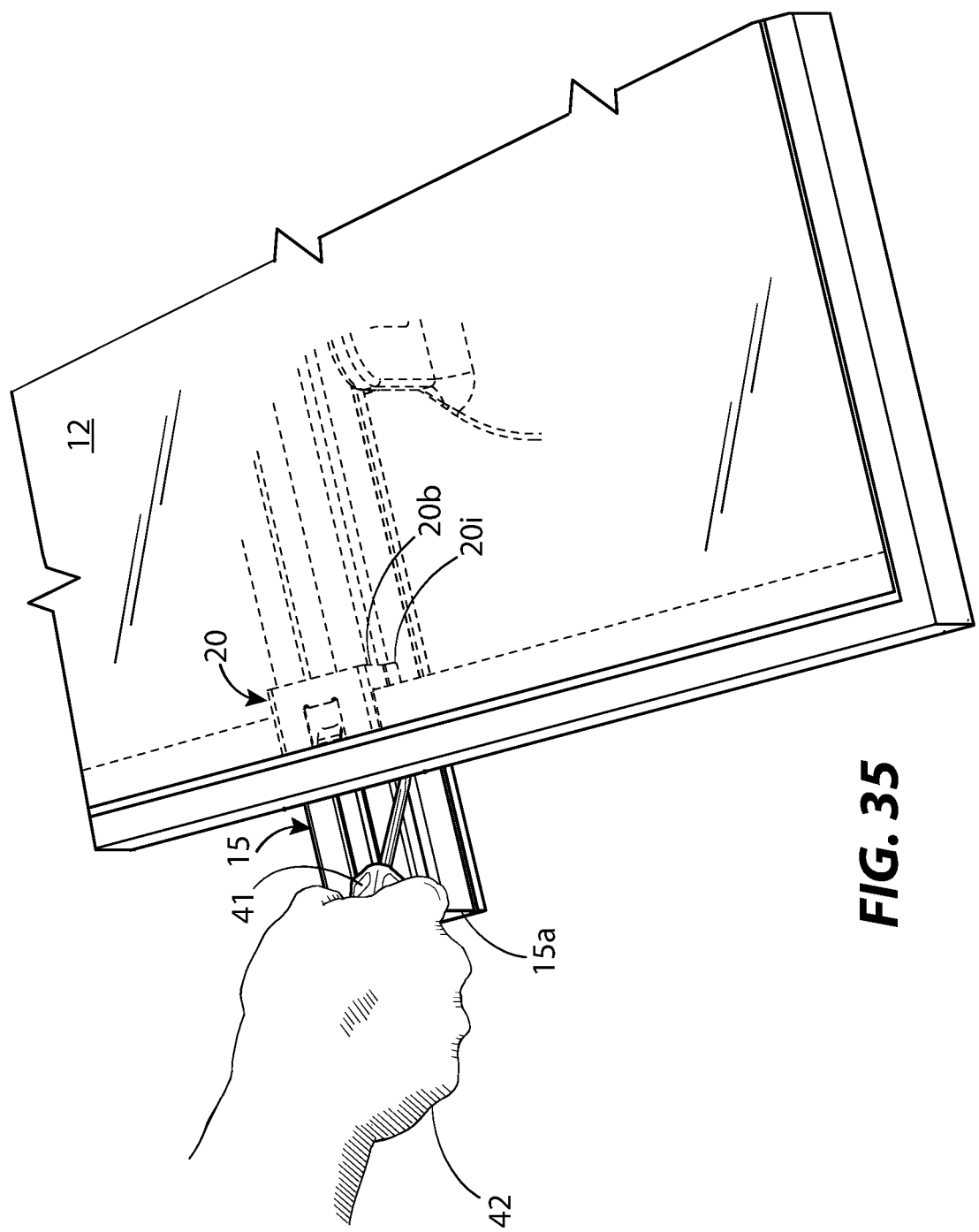
FIG. 35 illustrates, in left and top perspective view, a step in the removal of an end-clamp version of the bottom clamp by prying the front side of the bottom clamp away from the rail, with dashed lines representing portions hidden from view.
Figure 36:
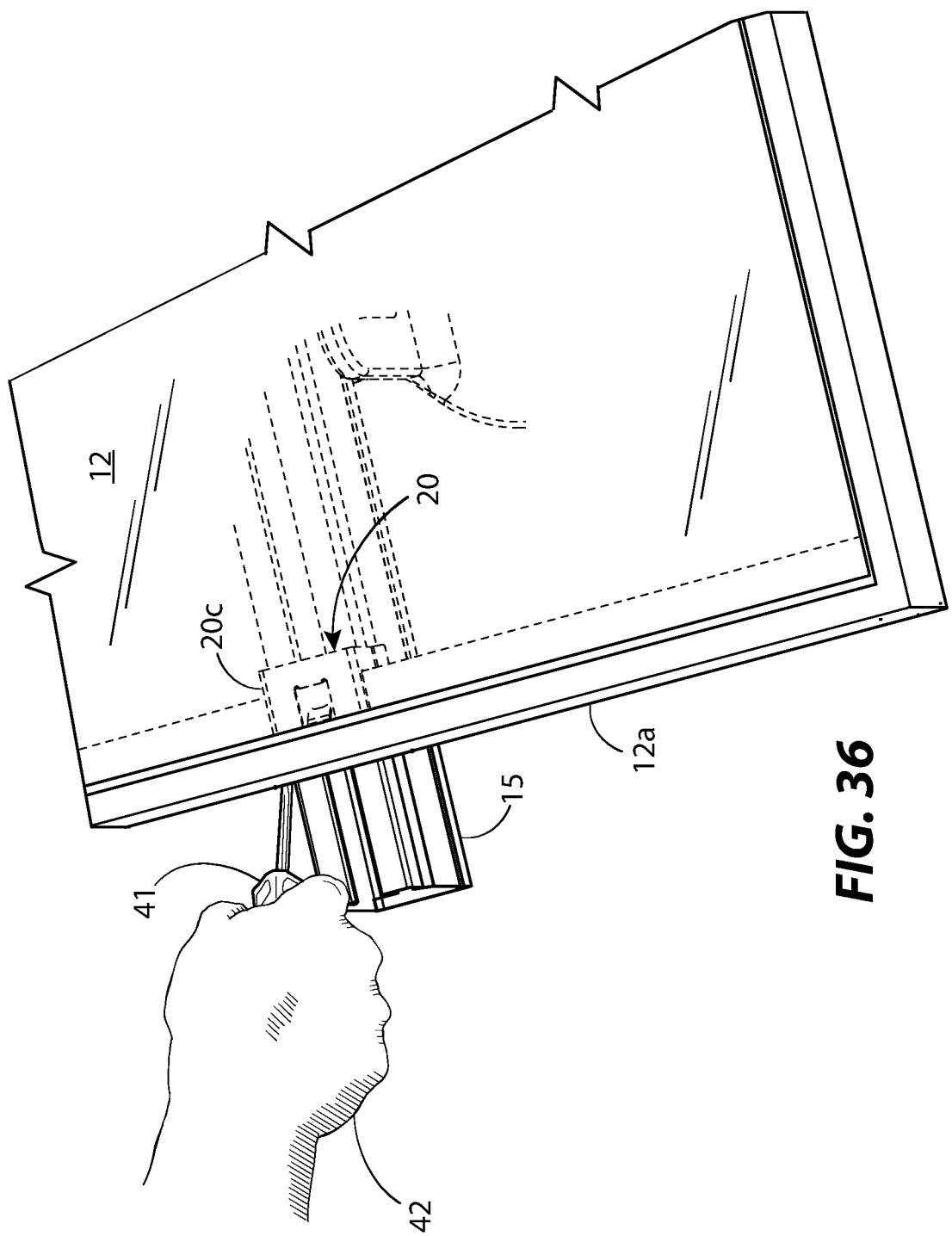
FIG. 36 illustrates, in left and top perspective view, a further step in the removal of the bottom clamp of FIG. 35 by prying the rear side of the bottom clamp away from the rail, with dashed lines representing portions hidden from view.
Figure 37:
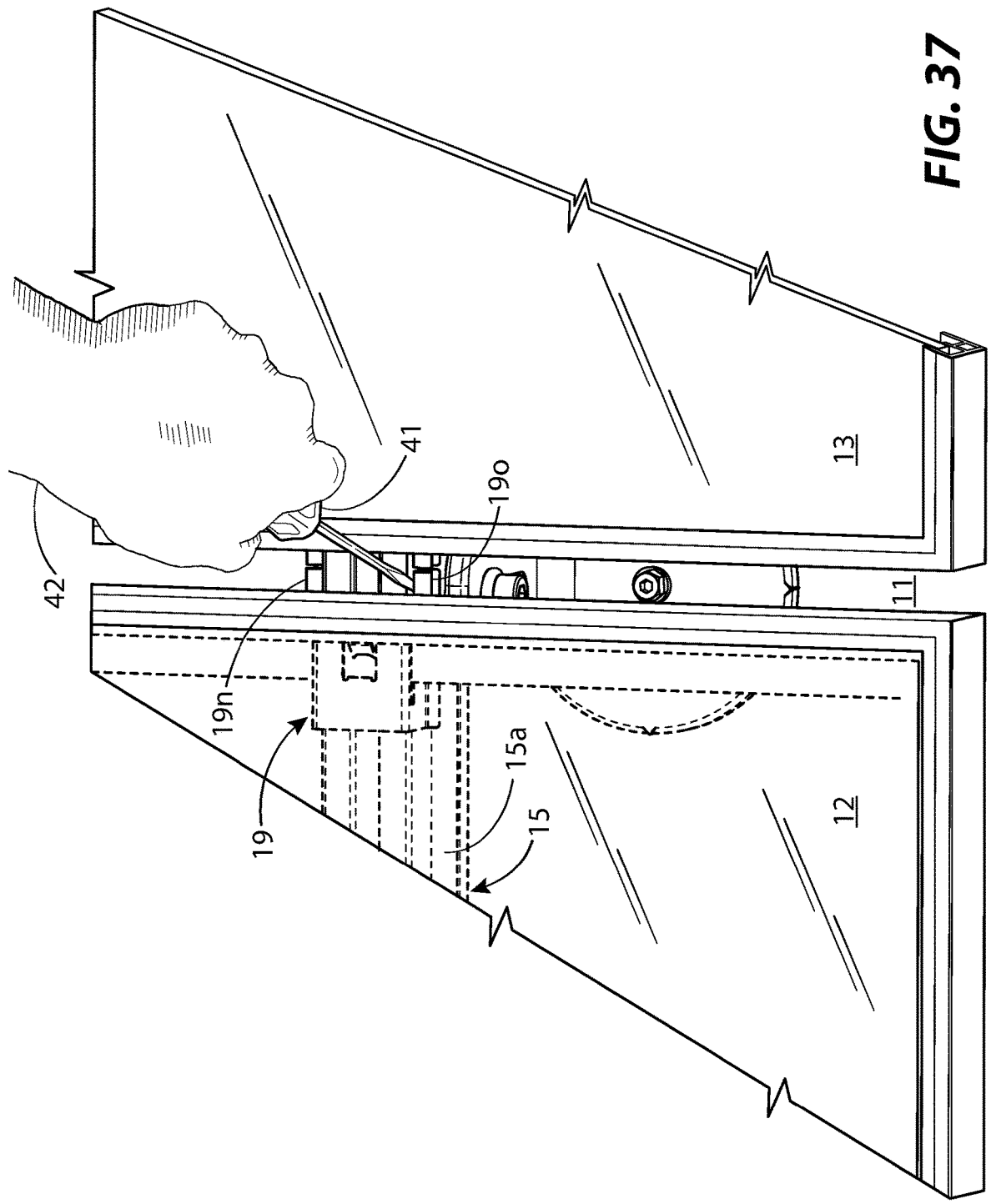
FIG. 37 illustrates, in top isometric view, a step in the removal of a mid-clamp version of the bottom clamp by prying the front side of the bottom clamp away from the rail, with dashed lines representing portions hidden from view.
Figure 38:
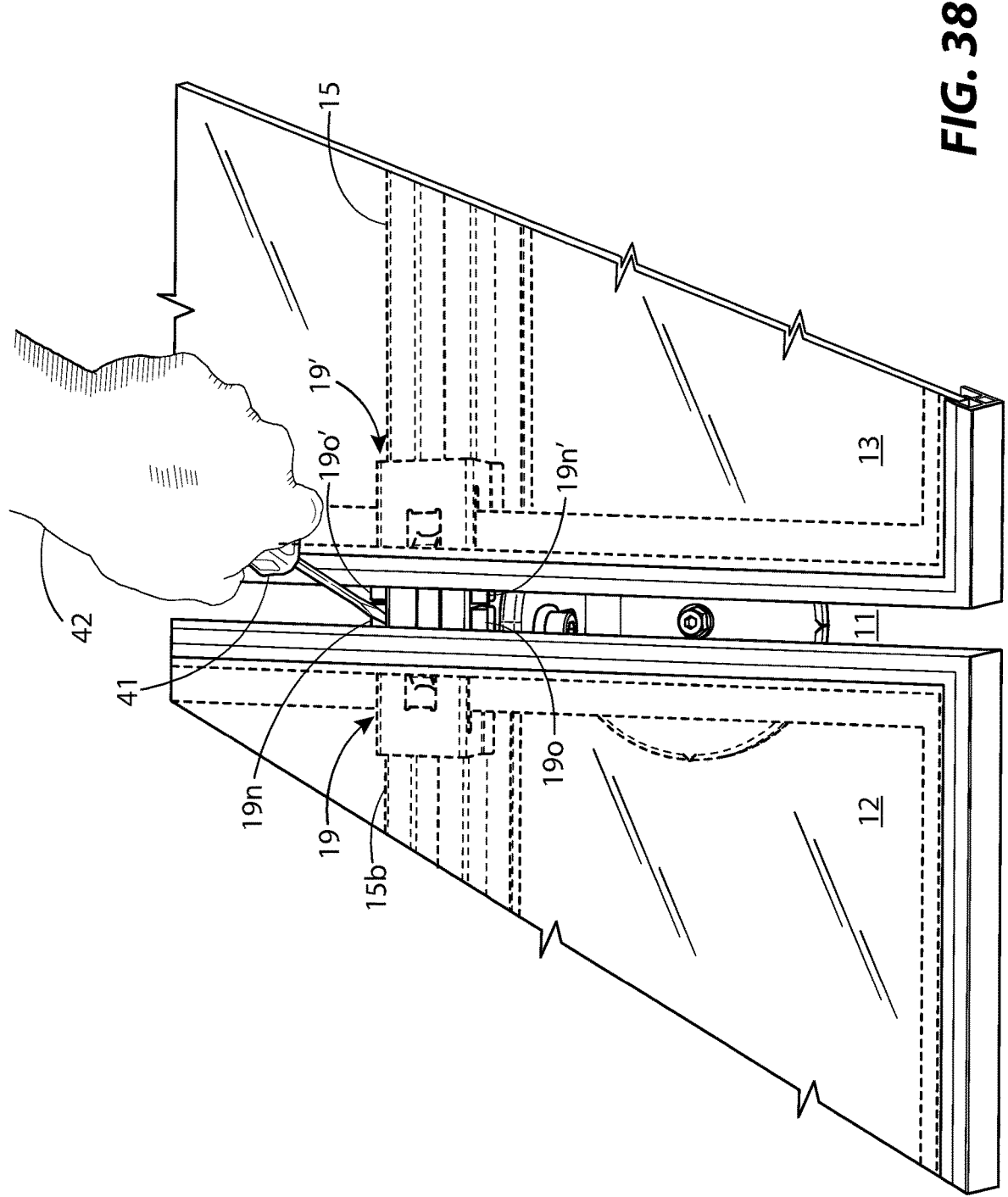
FIG. 38 illustrates, in top isometric view, a further step in the removal of the bottom clamp of FIG. 37 by prying the rear side of the bottom clamp away from the rail, with dashed lines representing portions hidden from view.

The bottom clamps 19, 20 are so structured as to allow removal by placing pressure on or by prying the sides of the bottom clamps from above the solar PV panel 12 in FIGS. 35 and 36, and solar PV panels 12, 13 in FIGS. 37 and 38. Referring to FIGS. 37 and 38, this is of particular significance for the mid-clamp version of the bottom clamp 19. Because the solar PV panels 12, 13 are mounted to a roof 11, they block access to the bottom clamp 19 from below the solar PV panels 12, 13. Typically, bottom clamps in the prior art can only be removed by side or bottom access. For this reason, for roof top applications, prior art bottom clamps can only be used as end clamps where side access is possible. Mid-clamp use of prior art clamps is restricted to applications where there is access below the panels, such as ground mount systems. One of the advantages of bottom clamp 19 is that it can be accessed from both above and below, so it can be used as a mid-clamp for both top access (e.g., roof mount) and bottom access (e.g., ground-mount) applications.

Referring to FIGS. 3-6, the bottom clamp 19 includes a top 19a and sides 19b, 19c projecting downward from opposite sides of the top 19a. The sides 19b, 19c are shown projecting perpendicularly downward from the top to optimize engagement with the rail sides 15a, 15b of FIG. 15. For rails that are substantially rectangular, sides 19b, 19c projecting perpendicularly downward from the top can help optimize engagement with the rail sides. Depending on the construction of the rail, the sides 19b, 19c could project downward from the top at other angles.

Figure 3:
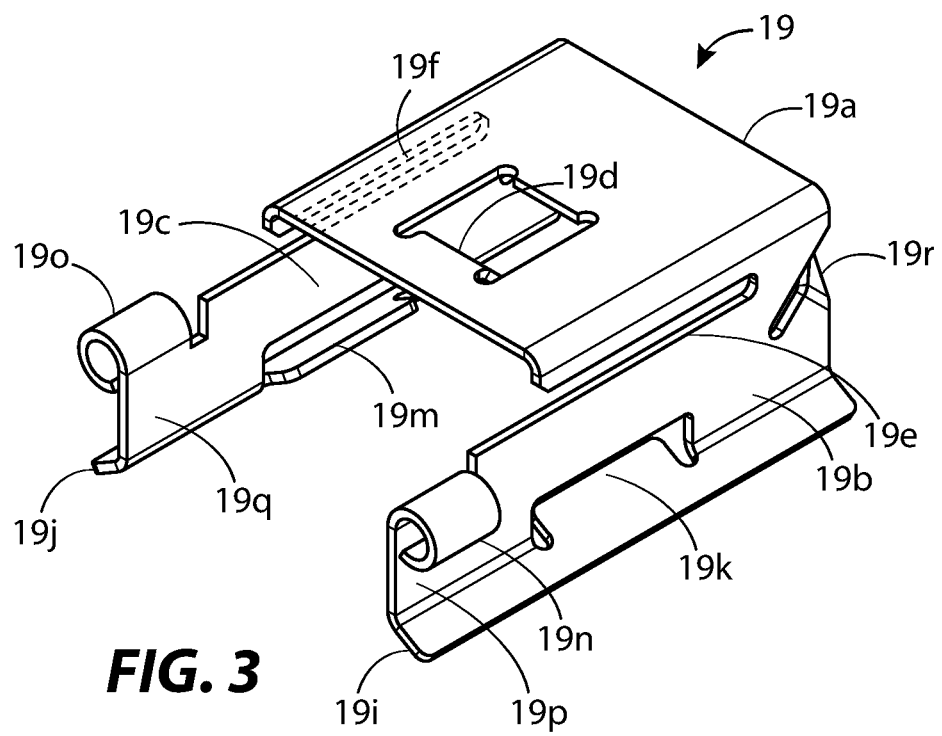
FIG. 3 illustrates, in top isometric view, a mid-clamp version of the bottom clamp where the dashed lines represent portions hidden from view.
Figure 4:
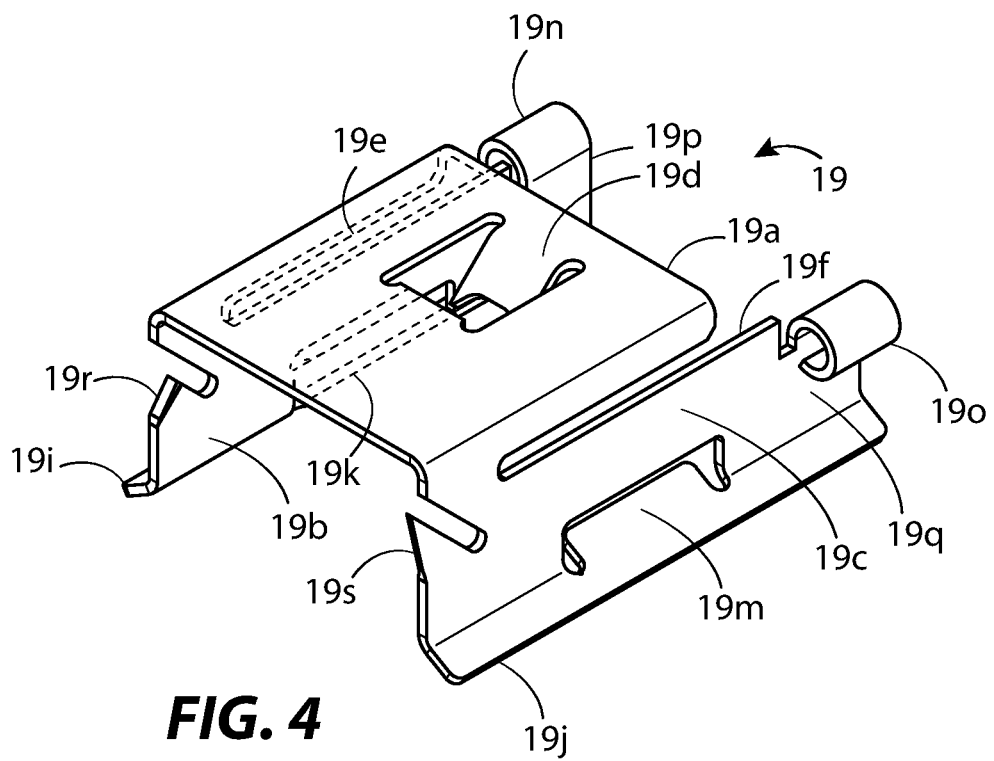
FIG. 4 illustrates, in an alternative top isometric view, the bottom clamp of FIG. 3 where the dashed lines represent portions hidden from view.
Figure 5:
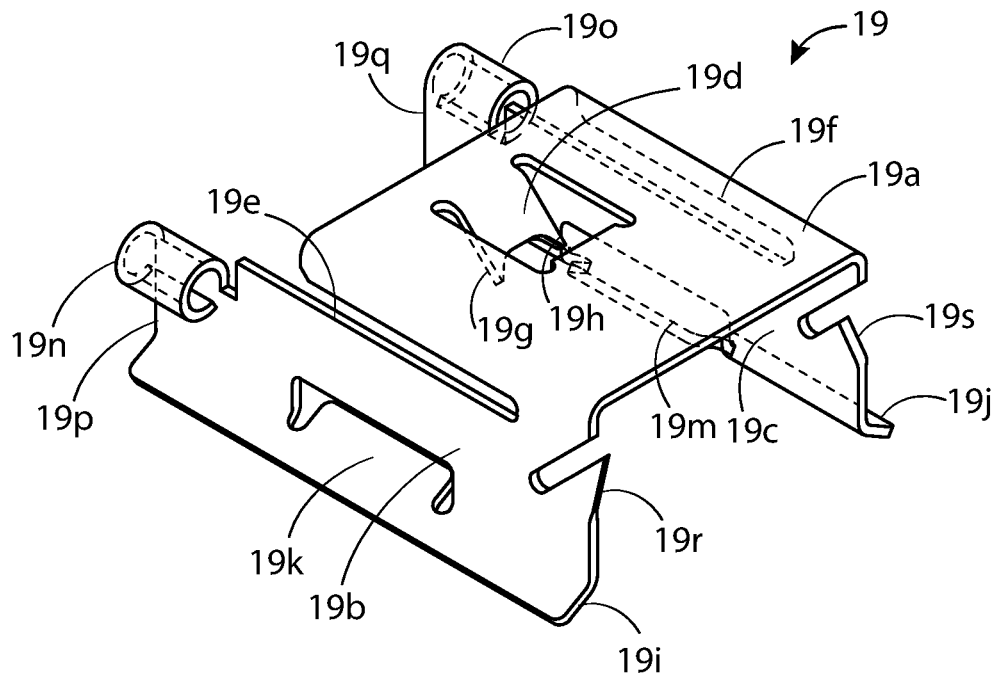
FIG. 5 illustrates, a second alternative top isometric view of the bottom clamp of FIG. 3 where the dashed lines represent portions hidden from view.

Referring to FIGS. 3-6, the top can include an upper tab 19d that projects obliquely downward from the top 19a. Referring to FIGS. 3-5, the sides 19b, 19c can include slots 19e, 19f, respectively. The slots 19e, 19f extend lengthwise and create an opening along one end of their respective sides. Slot 19f in FIGS. 3 and 5, and slot 19e in FIG. 4, are represented by dashed lines to indicate that they hidden from view.

Figure 11:
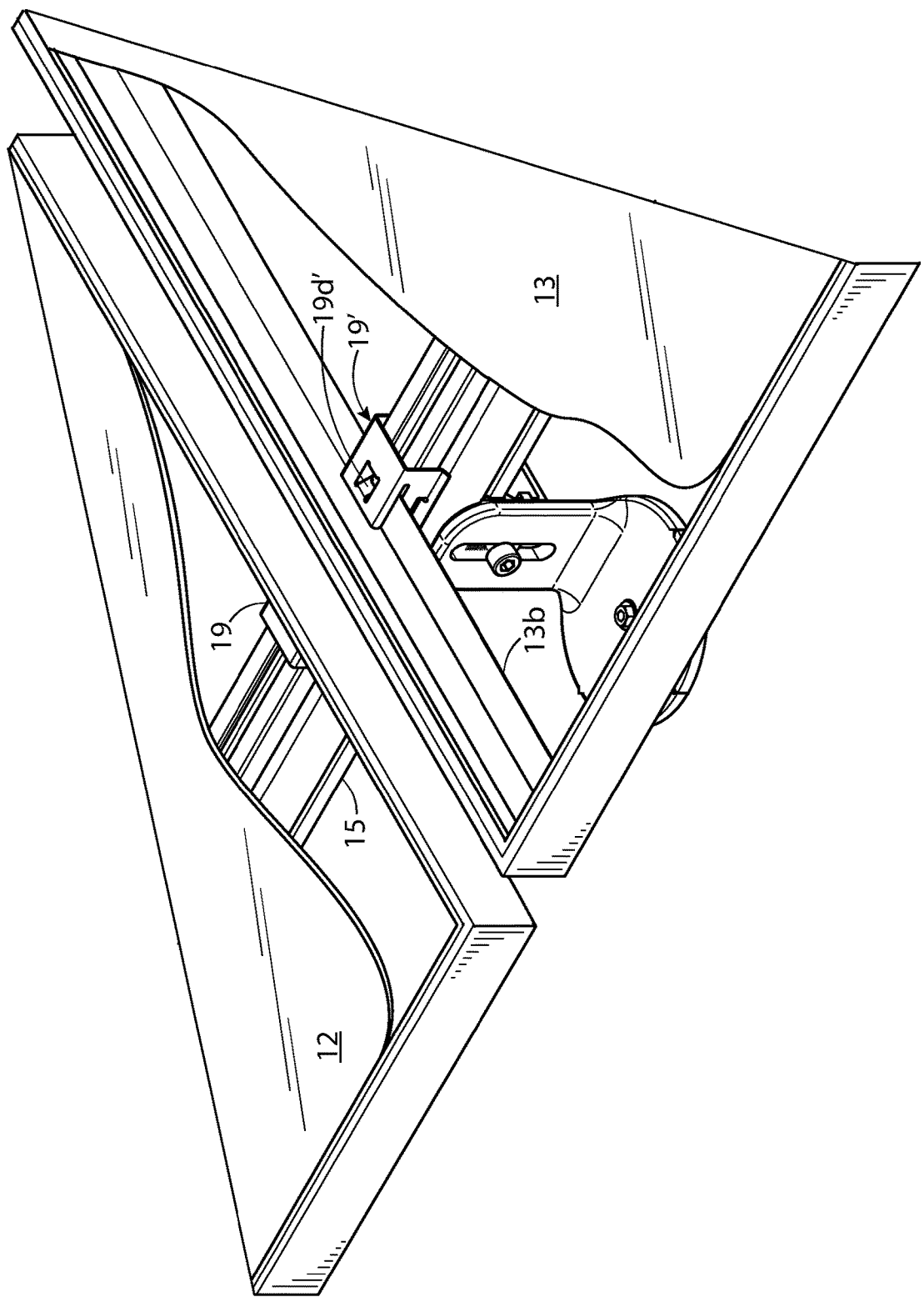
FIG. 11 illustrates, in top isometric view, a portion of a solar PV assembly of FIG. 1 with part of the solar PV panels cutaway to reveal mid-clamp versions of the bottom clamp securing the return flange of the solar panel frame to the rail.
Figure 12:
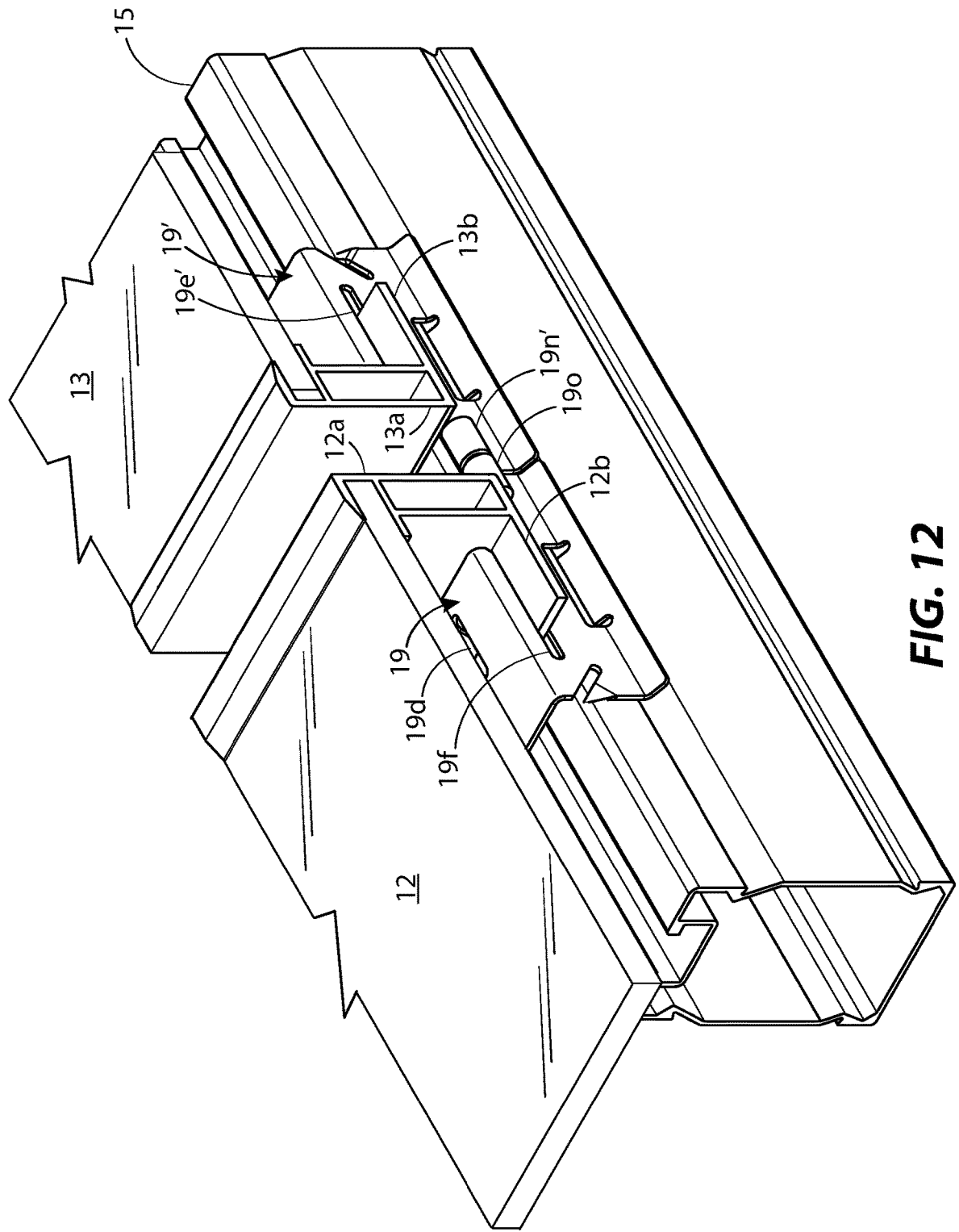
FIG. 12 illustrates, in top isometric view, an enlargement of a portion of FIG. 2 where solar PV panels are partially cutaway to show the relationship between the bottom clamp, solar panel return flange, and the rail.
Figure 13:
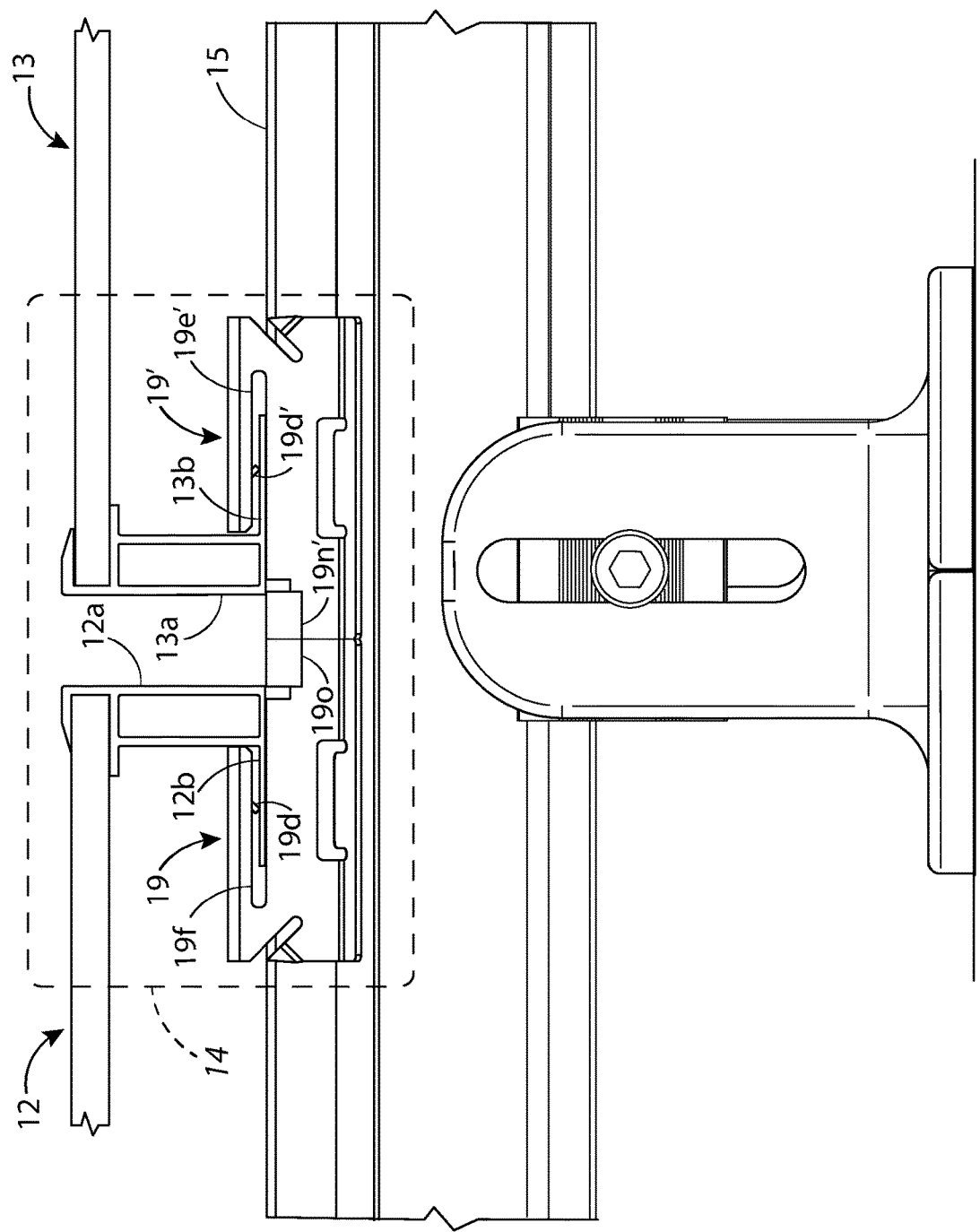
FIG. 13 illustrates an approximate front view of FIG. 12.
Figure 14:
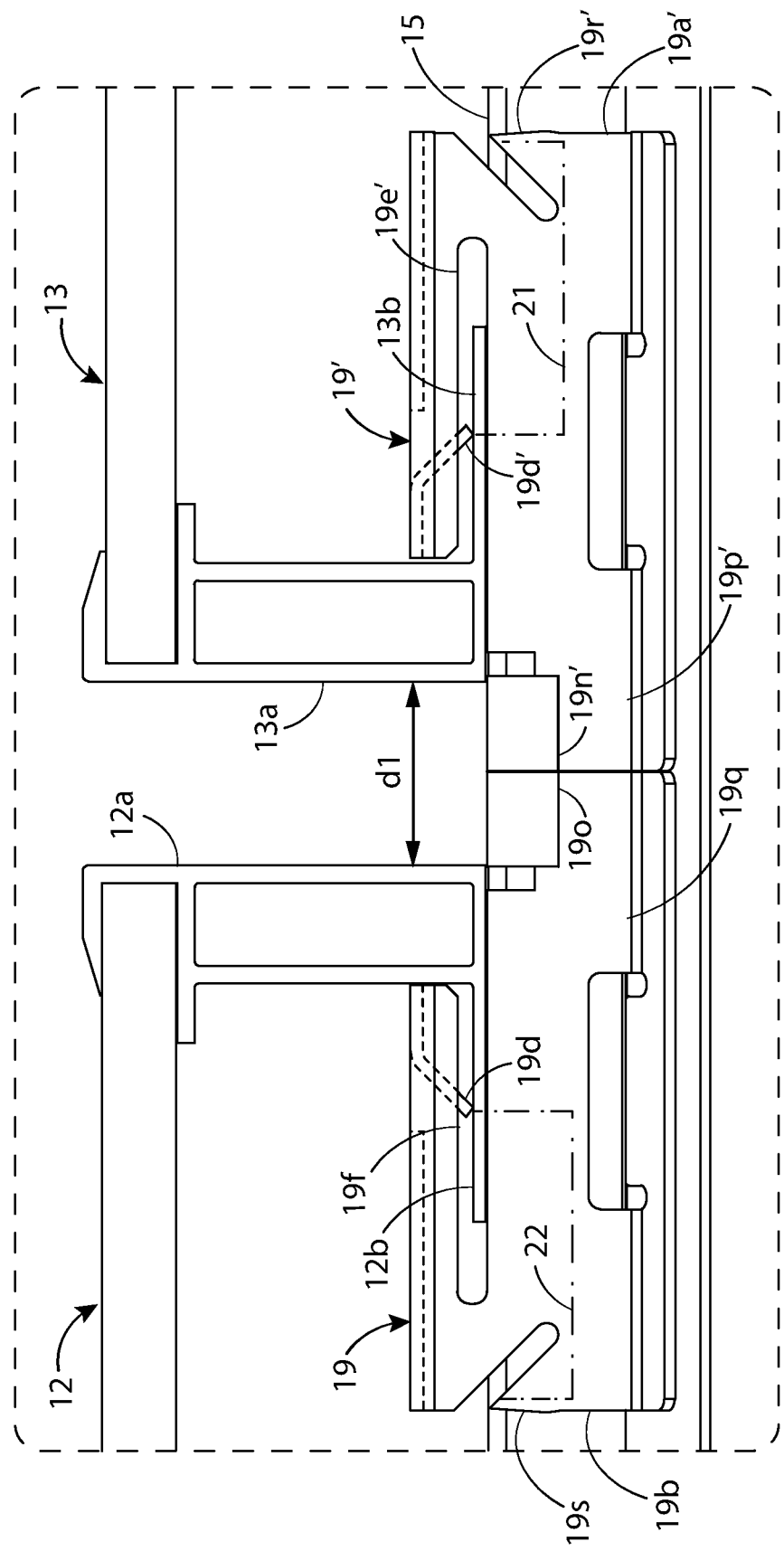
FIG. 14 illustrates, in front view, an enlarged version FIG. 13, showing the relationship between the solar panel frames, the rail, and the bottom clamps in more detail with portions of the bottom clamps where dashed lines represent portions hidden from view.

Referring to FIGS. 11-14, the bottom clamp 19, 19' slides onto its respective return flange of solar PV panels 12, 13, respectively. Referring to FIGS. 12-14, bottom clamp 19, 19 slides onto return flange 12b, 13b, of the frame 12a, 13a of the solar PV panels 12, 13 via the slots 19f, 19e', respectively. The slot 19f, and slot 19e hidden from view, are sized and positioned to receive the return flange 12b and align the return flange to engage the upper tab 19d. The upper tab 19d is sized and positioned to engage the top of the return flange 12b under tension and press it against the rail 15. Referring to FIGS. 11-14, similarly, Slot 19e', and slot 19f hidden from view, are sized, and positioned to receive the return flange 13b. Referring to FIGS. 11, 13, and 14, the upper tab 19d' is sized and positioned to engage the top of the return flange 13b under tension and press it against the rail 15.

Referring to FIGS. 4, 5, 12, and 14, the upper tab 19d extends obliquely downward and is angled obliquely away from the opening of the slots 19e, 19f (slot 19e hidden in FIGS. 12 and 14) making the bottom clamp 19 difficult to remove because of spring tension and thereby locking it into place. The upper tab 19d is typically sized so the end of the upper tab 19d extends proximate to the plane that runs between slots 19e, 19f. Because the return flange 12b of FIGS. 12-14 is positioned between the slots 19e, 19f, having the upper tab 19d sized and positioned in this way would hold the return flange under tension.

Figure 6:
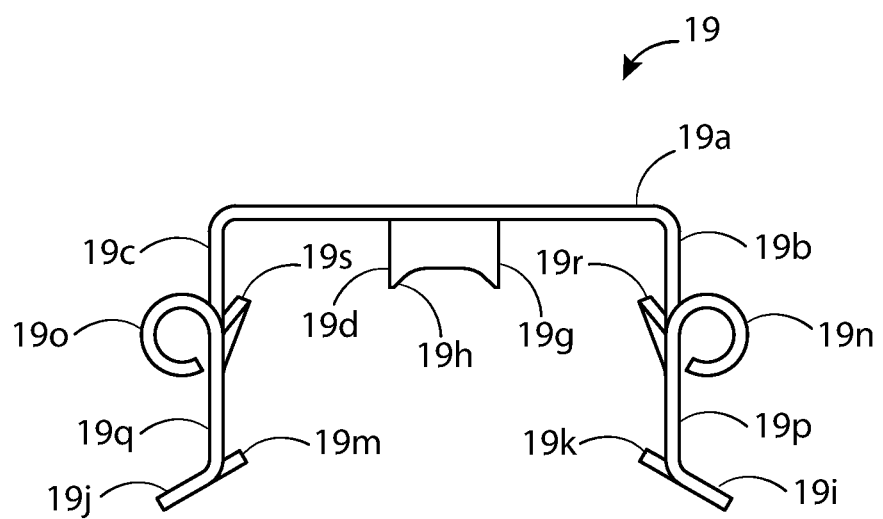
FIG. 6 illustrates, in side view, the bottom clamp of FIG. 3.

Referring to FIGS. 5 and 6, the upper tab 19d can optionally include prongs 19g, 19h to dig into the return flange 12b of FIGS. 12-14. Referring to FIGS. 12-14, If the bottom clamp 19 is made from an electrically conductive material, such as steel or aluminum, this can create an electrically conductive path between the return flange 12b and the upper tab 19d. For example, the surface of aluminum will generally form a non-conductive oxide layer when exposed to the elements. Referring to FIGS. 5 and 6, the prongs 19g, 19h, when pressed against the return flange can break the oxide layer of the return flange and allow electrical current to flow from the bottom clamp 19 to the return flange 12b of FIGS. 12-14. Teeth, a beveled edge, or other sharpened structures can be used in place of the prongs.

Referring to FIGS. 3-6, the sides 19b, 19c include flanges 19i, 19j, respectively and extending outward from the bottom of their respective side. Tabs 19k, 19m extend inward from flange 19i, 19j, respectively, allowing the bottom clamp 19 to snap onto the sides of a rail from above. The combination of tabs 19k, 19m projecting inward from the flanges 19i, 19j projecting outward, make disassembly by prying easier. Disassembly will be discussed in FIGS. 35-38.

Referring to FIG. 6, tab 19k is shown projecting along the same plane as flange 19i. Similarly, tab 19m is shown projecting along the same plane as flange 19j. This is done for the purpose of simplifying the sheet metal fabrication process and reducing cost. Tab 19k, 19m and flange 19i, 19j, can be non-planar if required.

Figure 15:
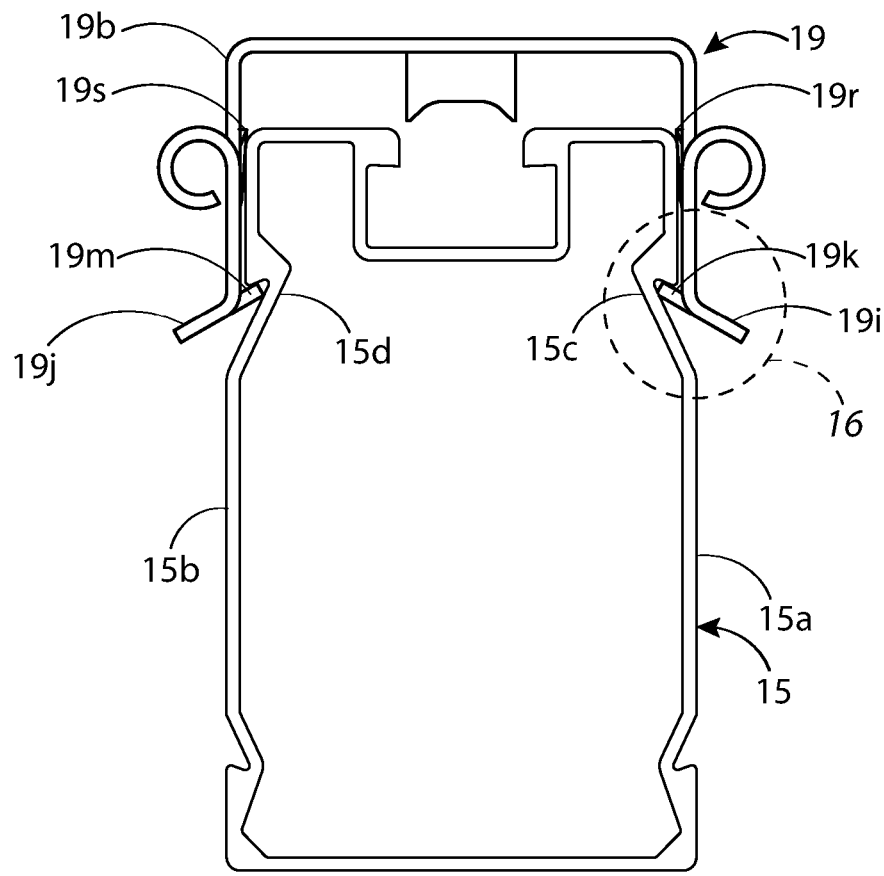
FIG. 15 illustrates, in side view, the bottom clamp of FIG. 3 secured to a rail that includes detented side portions.
Figure 16:
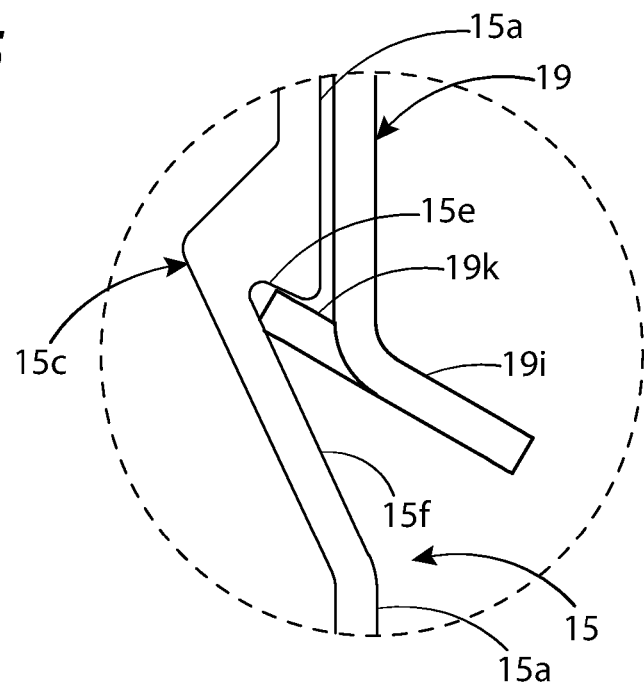
FIG. 16 illustrates, in side view, an enlarged view of a portion FIG. 15 to better show details of one of the detented side portions of the rail.
Figure 17:
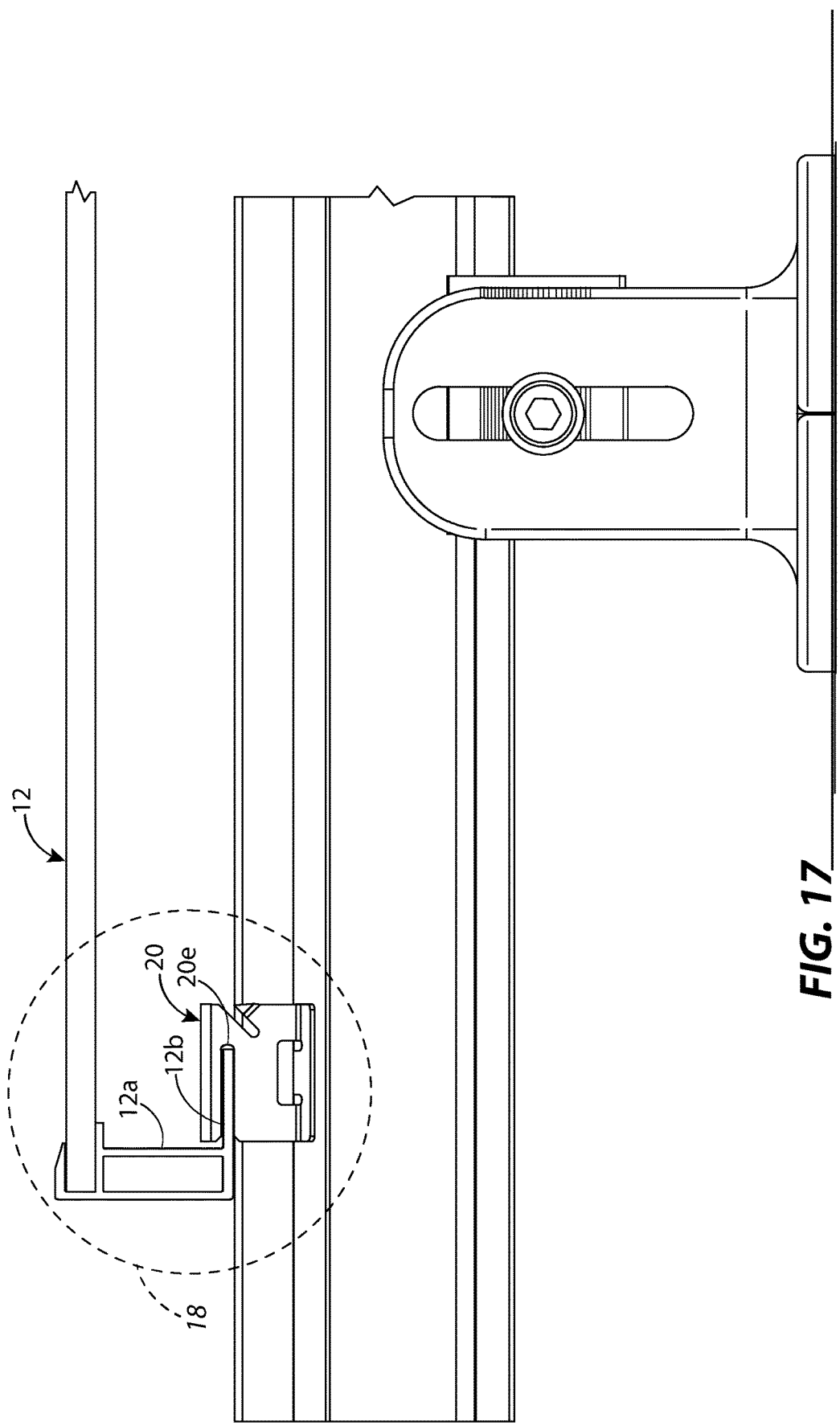
FIG. 17 illustrates, in front view, a left end portion of FIG. 2 showing the relationship between the solar panel frame, the rail, and the end-clamp version of the bottom clamp.

The angle of tabs 19k, 19m of FIG. 6 can be optimized for the structure of a rail. The rail typically includes structure that prevents the tab from moving upward. The rail sides could be slotted to hold the tabs 19k, 19m from moving upward. Alternatively, the rail sides could be slotless. For example, referring to FIG. 15, rail 15, used throughout this disclose, includes rail sides 15a, 15b that are slotless. The rail sides 15a, 15b include corresponding detented side portions, the detented side portions 15c, 15d. The tabs 19k, 19m of the bottom clamp 19 engage detented side portions 15c, 15d, respectively, as the bottom clamp 19 is pushed down over the rail 15. Referring to FIG. 16, the tab 19k of the bottom clamp 19, resists upward movement because the detented side portion 15c includes a first sloped portion 15e that projects downward and outward and a second sloped portion 15f that projects upward and inward. The first sloped portion 15e being positioned directly above the second sloped portion 15f and both the first sloped portion 15e and the second sloped portion 15f are positioned between the rail side 15a. Because the tab 19k is sloped upward and inward, pulling up on bottom clamp 19 would cause the tab 19k to bend opposite to its natural direction of movement, and thus create a spring force to resist movement against the first sloped portion 15e. Referring to FIG. 15, tab 19m will resist upward movement against the detented side portion 15d of the rail side 15b in the same way as described for tab 19k and the detented side portion 15c.

One of the advantages of the mid-clamp version of the bottom clamp 19 illustrated in FIGS. 3-6 is that it allows the installer to space apart the solar PV panels uniformly and at a predetermined distance by virtue of the structure of the bottom clamps 19. As illustrated in FIGS. 12-14, spacer 19n', 19o space apart a predetermined distance the bottom clamp 19 and bottom clamp 19'. Bottom clamps 19, 19' are attached to directly adjacent solar PV panels, solar PV panels 12, 13, respectively. Referring to FIGS. 3-6, sides 19b, 19c include extensions 19p, 19q, that extend the sides beyond the edge of the slots 19e, 19f, respectively. Spacer 19n, 19o form a portion of the extensions 19p, 19q, respectively. Referring to FIG. 14, this predetermined distance dl is based on how far the spacer 19n, 19o and the extensions 19p, 19q, extends the sides 19b, 19c, respectively beyond the edge of the openings of the slots 19e, 19f.

The end-clamp version of the bottom clamp 20 of FIGS. 7-10 shares many of the same features and structures of the mid-clamp version of the bottom clamp 19 of FIGS. 3-6. The main difference between the two clamps being the addition of spacers 19n,19o and the extensions 19p, 19q for the bottom clamp 19 in FIGS. 3-6.

Figure 7:
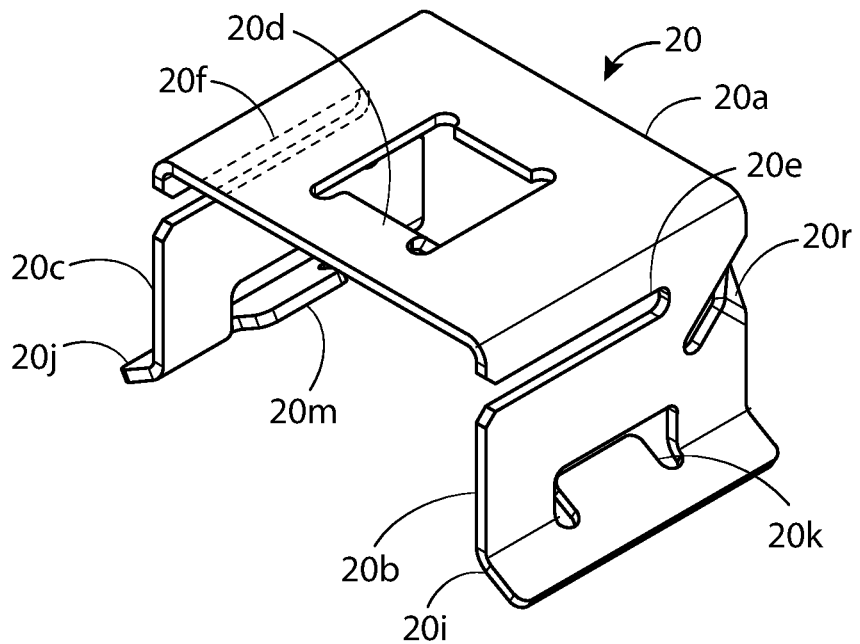
FIG. 7 illustrates, in top isometric view, an end-clamp version of the bottom clamp where the dashed lines represent portions hidden from view.
Figure 8:
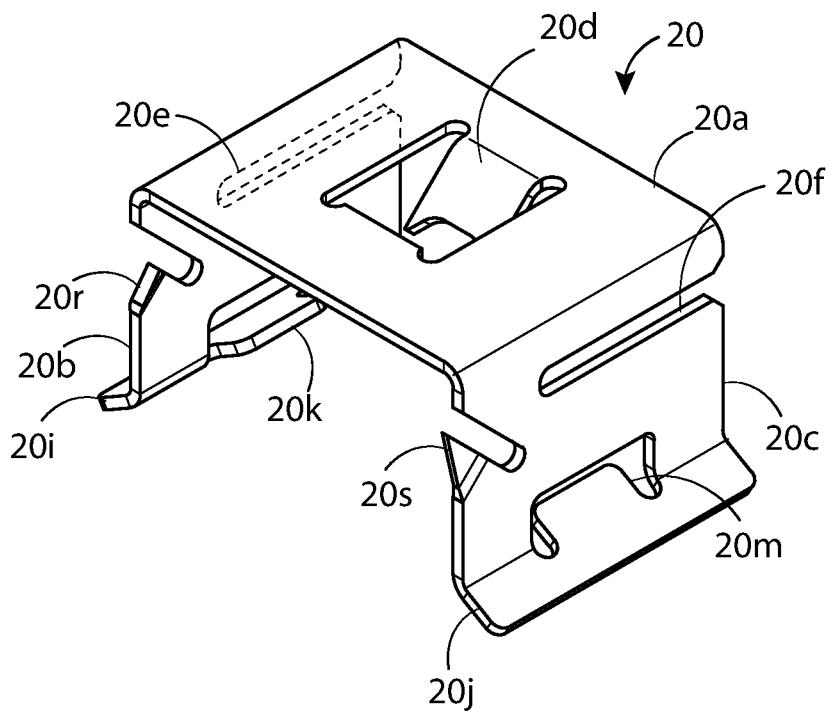
FIG. 8 illustrates, in an alternative top isometric view, the bottom clamp of FIG. 7 where the dashed lines represent portions hidden from view.
Figure 9:
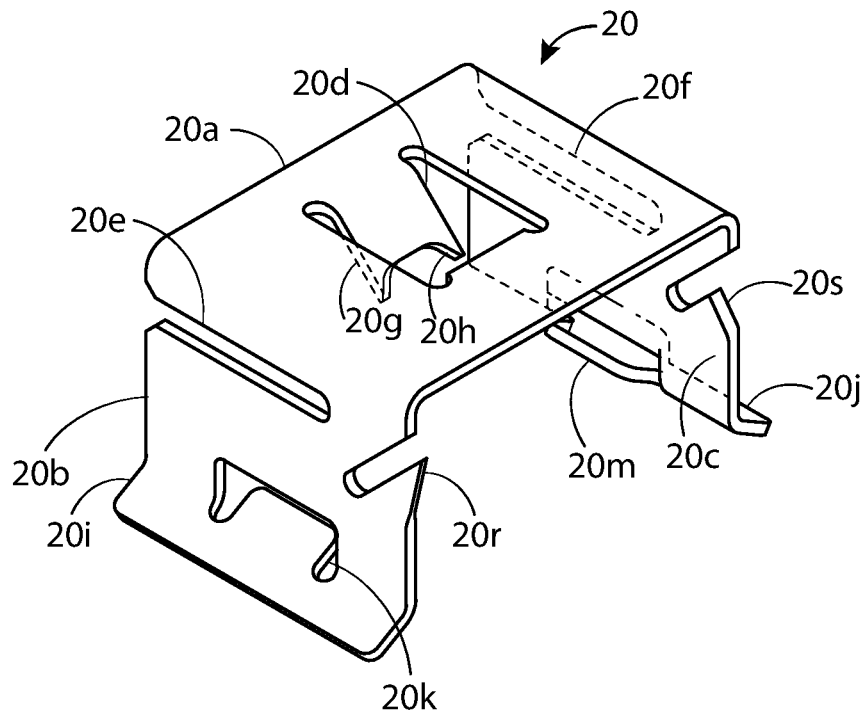
FIG. 9 illustrates, a second alternative top and left isometric view of the bottom clamp of FIG. 7 where dashed lines represent portions hidden from view.

Referring to FIGS. 7-10, the bottom clamp 20 includes a top 20a and sides 20b, 20c projecting downward from opposite sides of the top 20a. The top can include an upper tab 20d that projects obliquely downward from the top 20a. As with the upper tab 19d shown in FIGS. 5 and 6, referring to FIGS. 9 and 10, the upper tab 20d can include prongs 20g, 20h, teeth, or other sharpened ends to dig into the return flange of the solar PV panel, as previously described. Referring to FIGS. 7-9, the sides 20b, 20c can include slots 20e, 20f, respectively. The slots 20e, 20f extend lengthwise and create an opening along one end of their respective sides. In FIGS. 7 and 9, slot 20f is represented by dashed lines indicating that it is hidden from view. In FIG. 8 slot 20e is represented by dashed lines indicating that it is hidden from view.

Referring to FIGS. 7-10, the bottom clamp 20 also includes flanges 20i, 20j projecting outward from the bottom of the sides 20b, 20c, respectively. Tabs 20k, 20m project inward and upward from flanges 20i, 20j, respectively. The combination tabs projecting inward and upward from the flanges 20i, 20j and the tabs 20k, 20m projecting outward, help make disassembly by prying easier.

Figure 18:
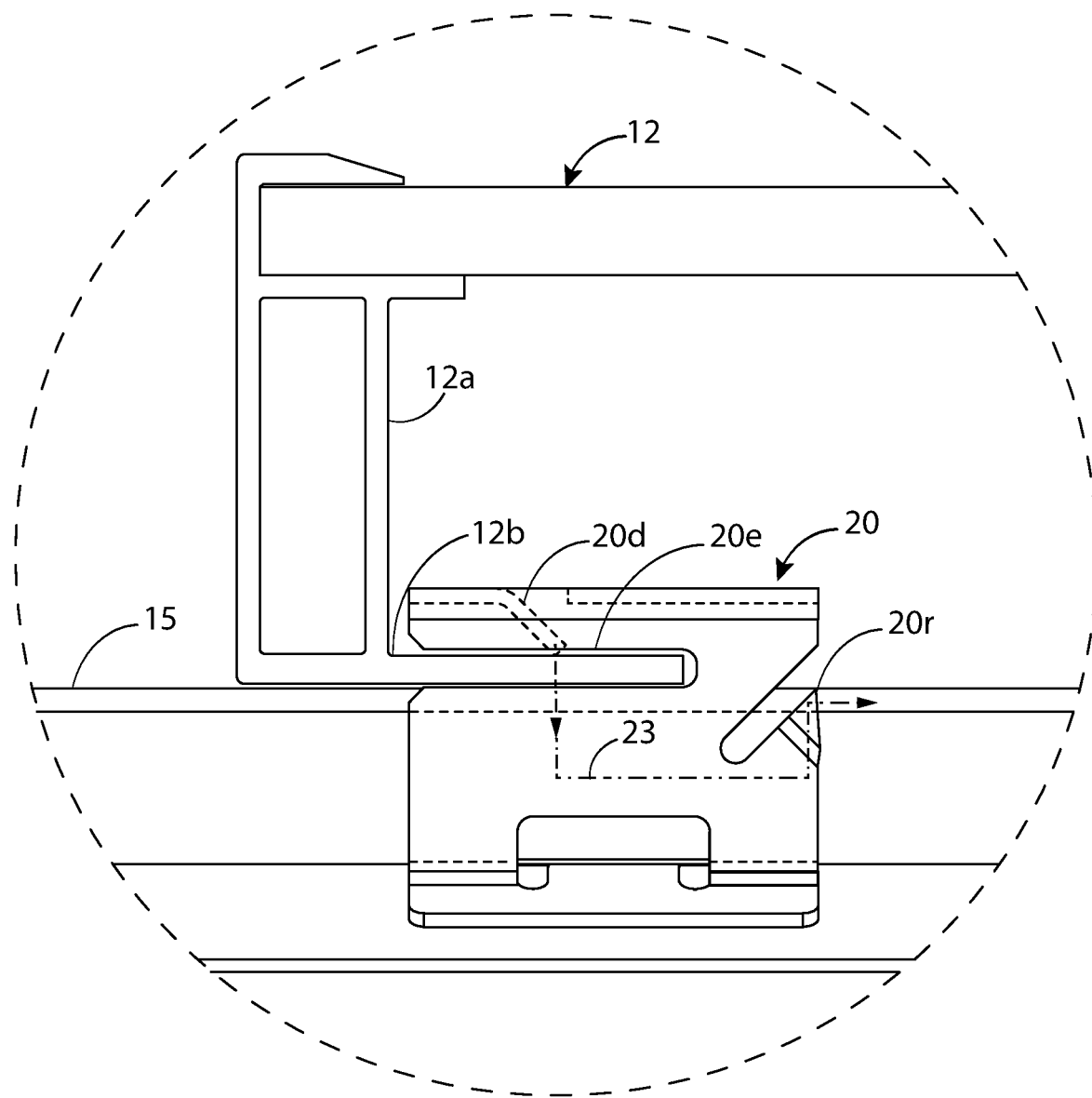
FIG. 18 illustrates, in front view, an enlarged version FIG. 17, showing the relationship between the solar panel frame, the rail, and the bottom clamp in more detail, and where dashed lines represent portions hidden from view.
Figure 19:
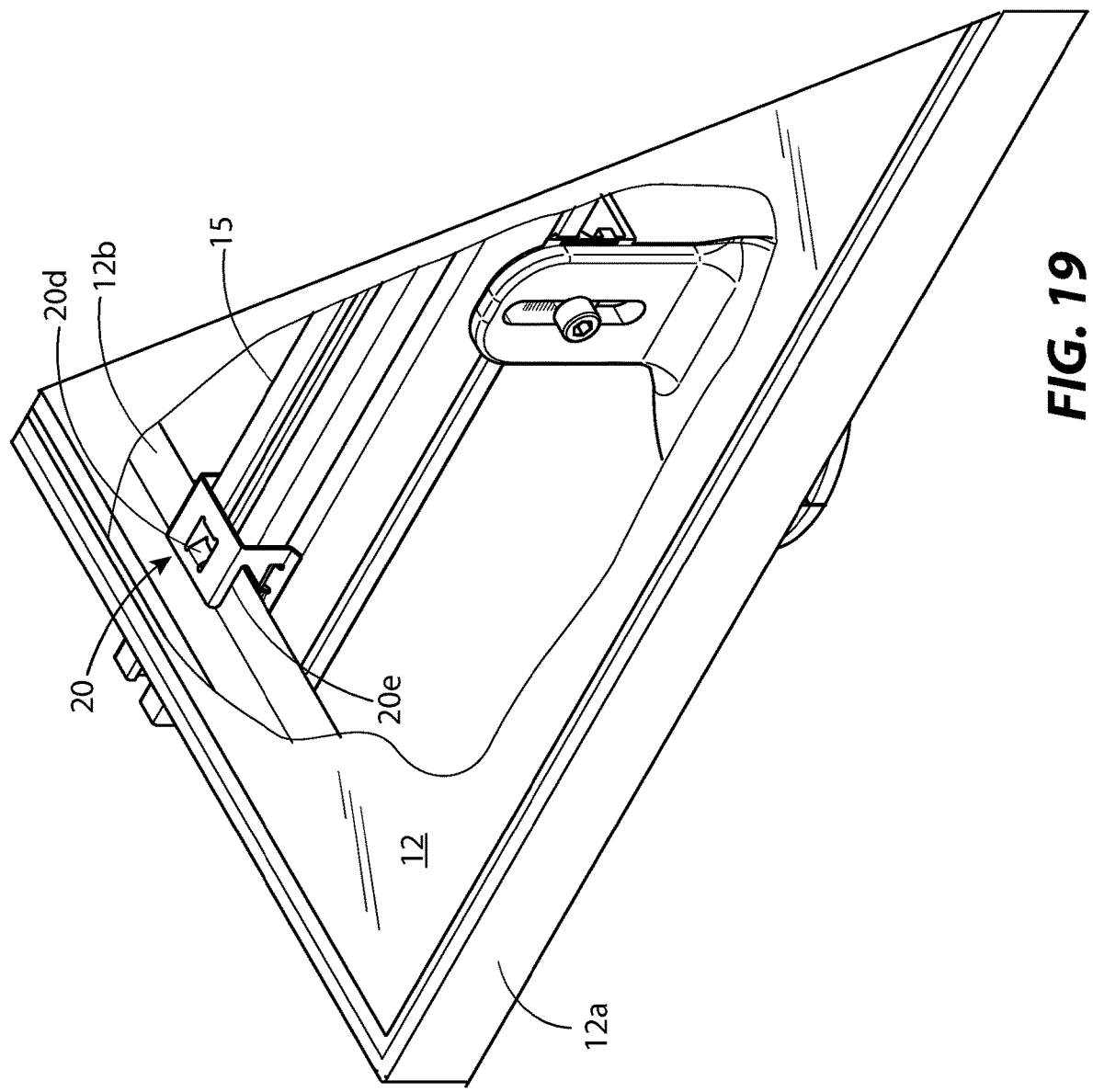
FIG. 19 illustrates, in isometric view, a portion of a solar PV assembly of FIG. 1 with a part of the solar PV panel cutaway to reveal an end-clamp version of the bottom clamp securing the return flange of the solar panel frame to the rail.
Figure 20:
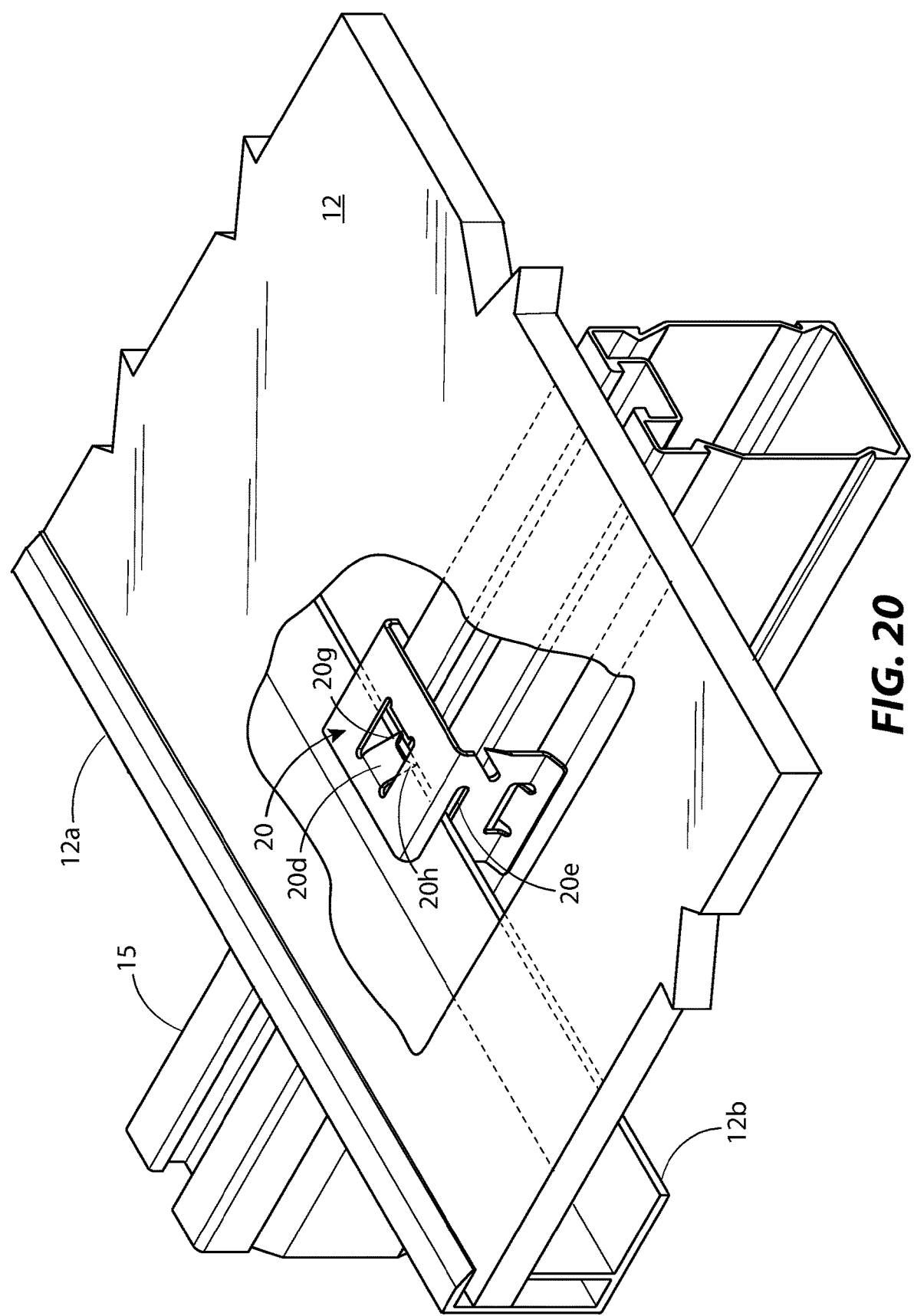
FIG. 20 illustrates, in top and left isometric view, a portion of FIG. 19, in more detail, where the solar PV panel is partially cutaway to show the relationship between the bottom clamp, solar panel return flange, and the rail.

In FIGS. 7-10, tabs 20k, 20m are illustrated also projecting through the sides 20b, 20c, respectively. Referring to FIGS. 17-20, the bottom clamp 20 slides onto the return flange 12b of the frame 12a of the solar PV panel 12 via the slots 20e, 20f. Slot 20f is hidden from view in these figures. The slots 20e, 20f are sized and positioned to receive the return flange 12b and align the return flange 12b to engage the upper tab. Referring to FIGS. 18-20, the upper tab 20d engages the top of the return flange 12b under tension and presses it against the rail 15. Referring to FIGS. 8, 9, and 18-20, the upper tab 20d is angled away from the opening of the slots 20e, 20f making the bottom clamp 20 difficult to remove because of spring tension and thereby locking it into place. As previous described for prongs 19g, 19h shown in FIGS. 5 and 6, the prongs 20g, 20h of FIGS. 9, 10, and 20, when pressed against the return flange 12b of FIG. 20, can break the oxide layer of the return flange and allow electrical current to flow from the bottom clamp 20 to the return flange 12b. Teeth, a beveled edge, or other sharpened structures can be used in place of the prongs.

Figure 21:
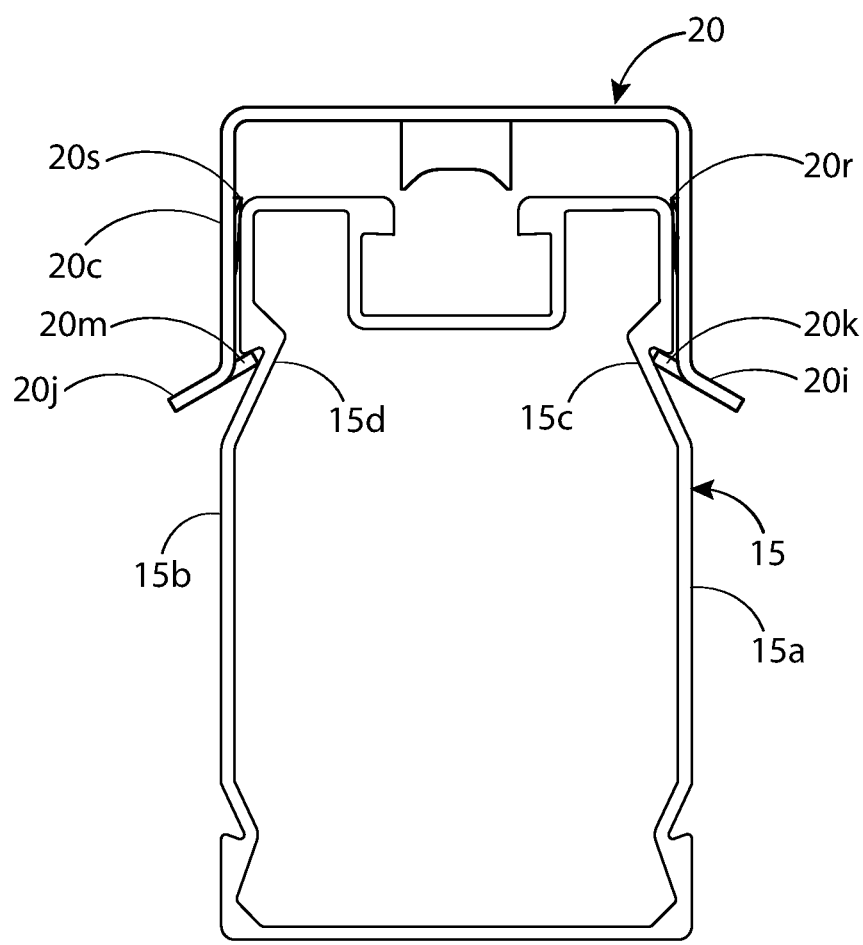
FIG. 21 illustrates, in side view, the bottom clamp of FIG. 7 secured to a rail that includes detented side portions.

Referring to FIG. 21, the tabs 20k and 20m of the bottom clamp 20 can engage rails, such as rail 15, in the same way as previously described for tabs 19k, 19m of FIGS. 15 and 16. The tabs 20k, 20m of the bottom clamp 20 engage the respective detented side portions, the detented side portions 15c, 15d, as the bottom clamp 20 is pushed down over the rail 15. The tabs 20k, 20m of the bottom clamp 20, resists upward movement because the detented side portions 15c, 15d include the multi-sloped structure described in FIG. 16.

Figure 10:
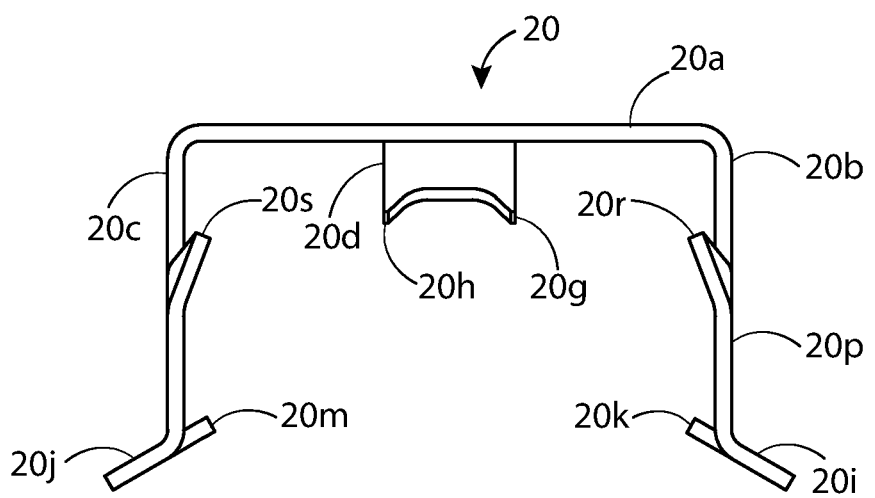
FIG. 10 illustrates, in side view, the bottom clamp of FIG. 7.

Referring to FIG. 10, tab 20k is shown projecting along the same plane as flange 20i. Similarly, tab 20m is shown projecting along the same plane as flange 19j. This is done for the purpose of simplifying the sheet metal fabrication process and reducing cost. Tab 20k, 20m and flange 20i, 20j, can be non-planar if required. The angle of tabs 20k, 20m can be optimized for the structure of the rail 15 as previous discussed in FIG. 15 for bottom clamp 19 and tabs 19k, 19m.

Both the mid-clamp version of the bottom clamp 19 and the end-clamp version of the bottom clamp 20 can optionally include spurs. In FIGS. 3-6, spurs 19r, 19s project inwardly from the sides 19b, 19c, respectively, with spur 19s hidden from view in FIG. 3. Referring to FIGS. 7-10, spurs 20r, 20s project inwardly from the sides 20b, 20c. Spur 20s is hidden from view in FIG. 7.

Referring to FIG. 15, the spurs 19r, 19s dig in to the rail sides 15a, 15b, respectively of rail 15 under tension. This breaks through the oxide layer of the rail and creates an electrically conductive path between the rail 15 and the bottom clamp 19. Referring to FIG. 14, a complete electrical path is created between the solar PV panel 12, rail 15, and bottom clamp 19 as illustrated by electrical path 22. A complete electrical path is created between the solar PV panel 13, rail 15, and bottom clamp 19' as illustrated by electrical path 21. Electrical paths 21, 22 are represented by dot-dashed lines. Electrical path 21 is created by the upper tab 19d' engaging the return flange 13b and by spurs 19r', 19s' engaging the rail 15. Spur 19s' is hidden from view. Similarly, electrical path 22 is created by upper tab 19d engaging return flange 12b and by the spurs 19r, 19s engaging the rail 15. Spur 19r is hidden from view.

Referring to FIG. 21, the spurs 20r, 20s dig in to the rail sides 15a, 15b, respectively of rail 15 under tension. This breaks through the oxide layer of the rail and creates an electrically conductive path between the rail 15 and the bottom clamp 19. Referring to FIG. 18, a complete electrical path is created between the solar PV panel 12, rail 15, and bottom clamp 20. Electrical path 23 is illustrated as dot-dashed lines. Electrical path 23 is created by the upper tab 20d engaging the return flange 12b and by the spur 20r, 20s engaging the rail 15. Spur 20s is hidden from view.

Figure 22:
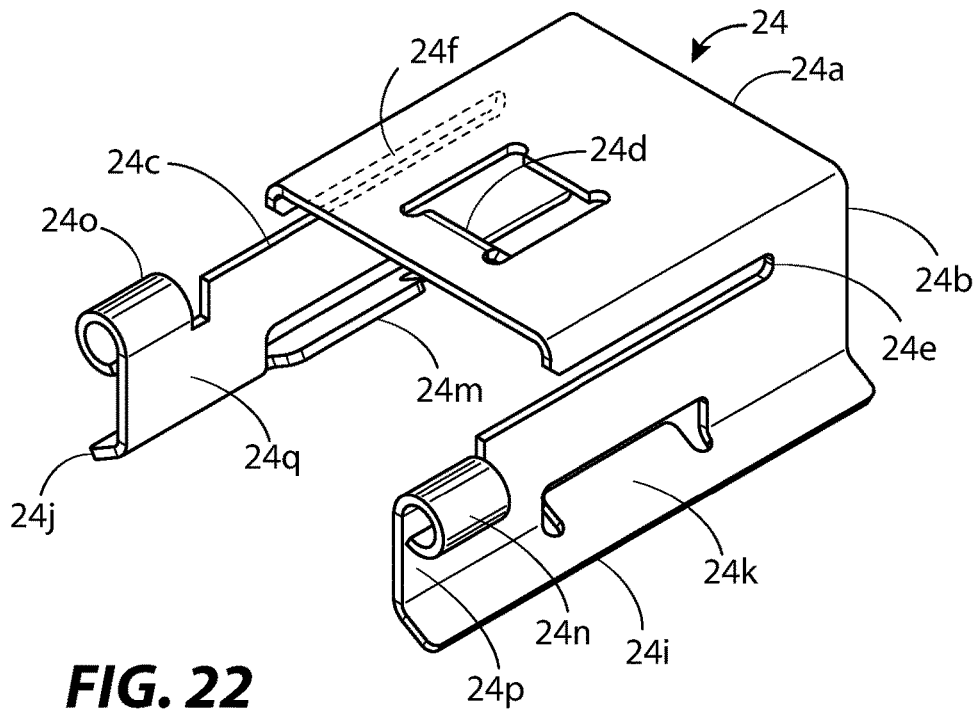
FIG. 22 illustrates, in top isometric view, an alternative example of a mid-clamp version of the bottom clamp where the dashed lines represent portions hidden from view.
Figure 23:
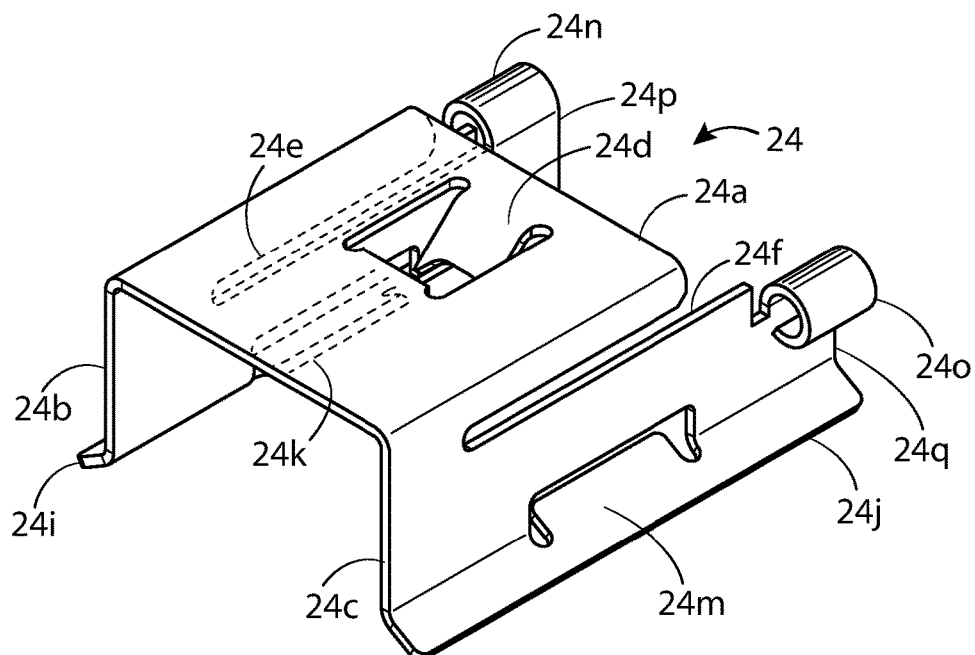
FIG. 23 illustrates, in an alternative top isometric view, the bottom clamp of FIG. 22 where the dashed lines represent portions hidden from view.

FIGS. 22-23 and FIGS. 24-25 illustrate examples of a mid-clamp version of the bottom clamp 24 and an end-clamp version of the bottom clamp 25, respectively, that do not have spurs. Referring to FIGS. 22-23, the bottom clamp 24 includes a top 24a, sides 24b, 24c, upper tab 24d, slots 24e, 24f, flanges 24i, 24j, tabs 24k, 24m, spacers 24n, 24o, and extensions 24p, 24q. The top 24a, sides 24b, 24c, upper tab 24d, slots 24e, 24f, flanges 24i, 24j, tabs 24k, 24m, spacers 24n, 24o, and extensions 24p, 24q are structured and function as described for the top 19a, sides 19b, 19c, upper tab 19d, slots 19e, 19f, flanges 19i, 19j, tabs 19k, 19m, spacers 19n, 19o, and extensions 19p, 19q, respectively, of FIGS. 3-5. The difference between bottom clamp 24 of FIGS. 22-23 and bottom clamp 19 of FIGS. 3-6 is the spurs and their associated structure.

Figure 24:
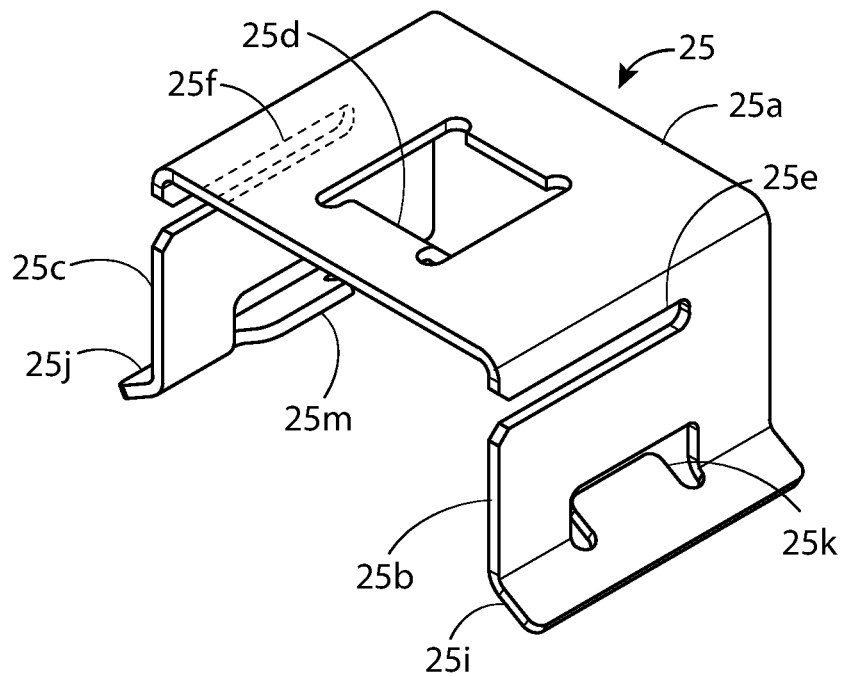
FIG. 24 illustrates, in a second alternative top isometric view, an alternative example of end-clamp version of the bottom clamp where dashed lines represent portions hidden from view.
Figure 25:
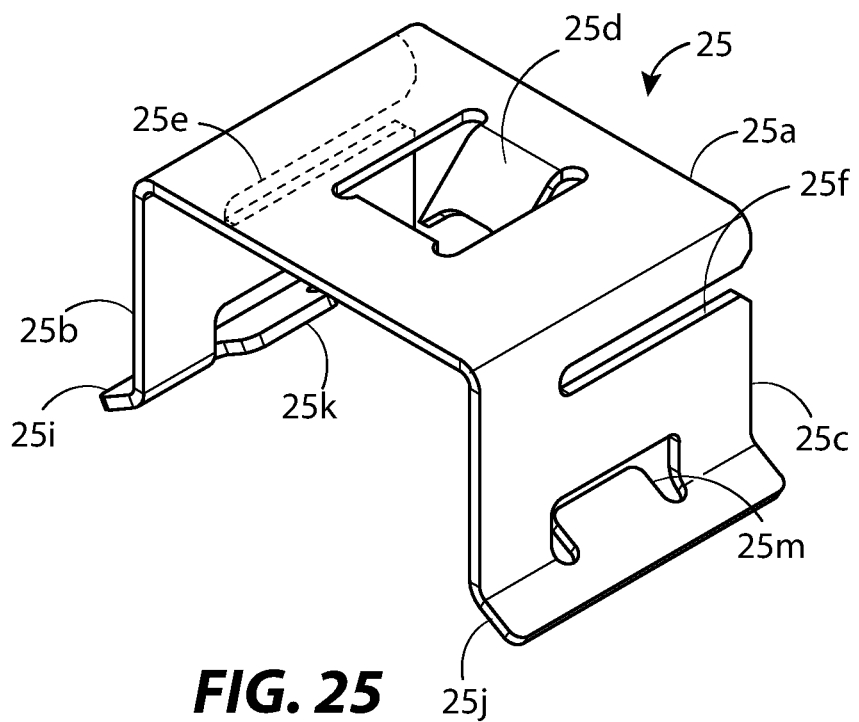
FIG. 25 illustrates, in a third alternative top isometric view, the bottom clamp of FIG. 24 where the dashed lines represent portions hidden from view.

Similarly, the top 25a, sides 25b, 24c, upper tab 25d, slots 25e, 25f, flanges 25i, 25j, and tabs 25k, 25m of FIGS. 24-25 are structured and function as described for the top 20a, sides 20b, 20c, upper tab 20d, slots 20e, 20f, flanges 20i, 20j, and tabs 20k, 20m, respectively, of FIGS. 7-9. The difference between the bottom clamp 25 of FIGS. 24-25 and the bottom clamp 20 of FIGS. 7-10 is the spurs and their associated structures.

Figure 26:
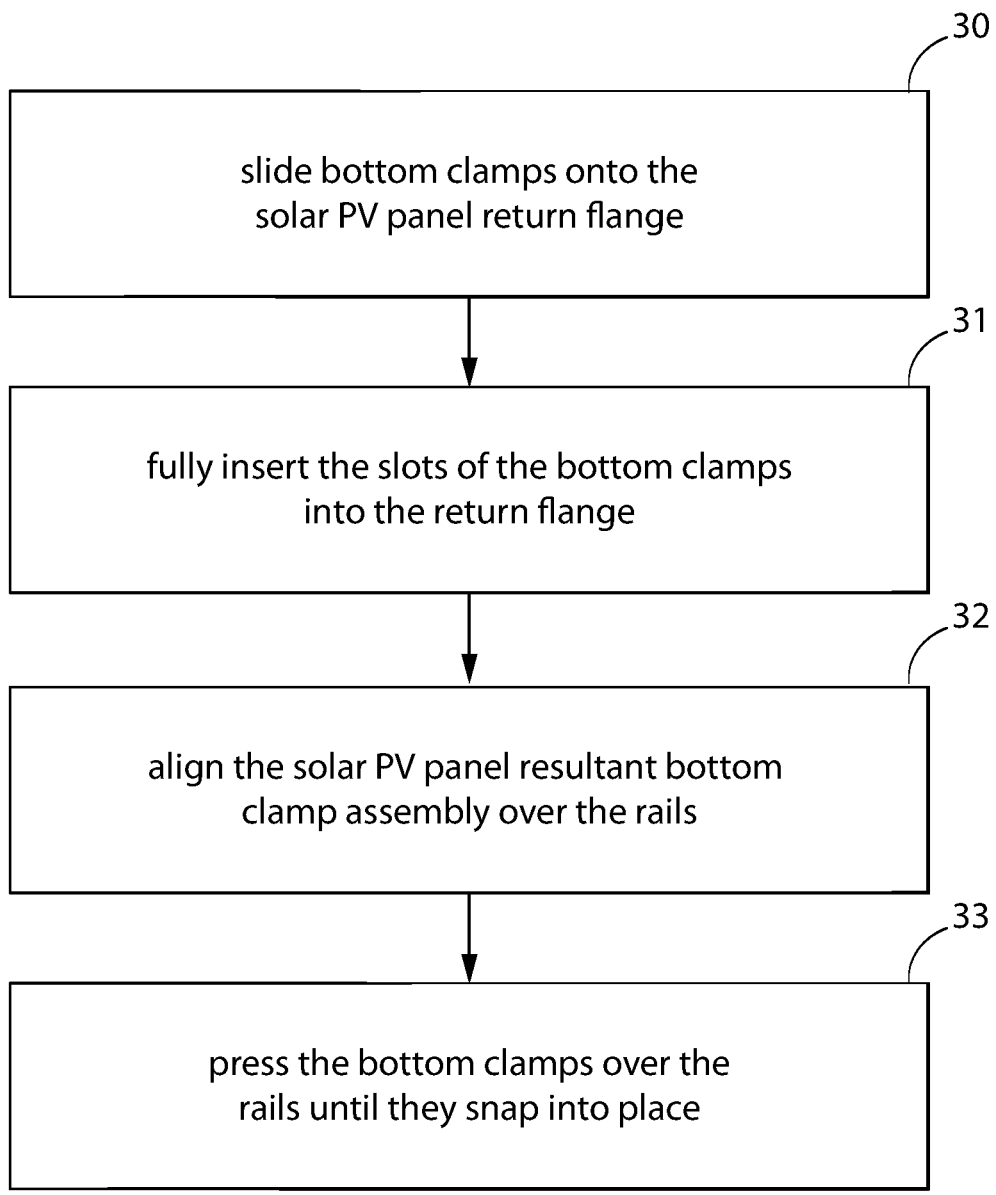
FIG. 26 illustrates a flow chart for assembling the solar PV panel and bottom clamps to rails.

FIG. 26 is a flow chart that represent a typical assembly sequence of solar PV panels and bottom clamps to a solar panel mounting system. The assembly sequence is illustrated in FIGS. 27-33 for solar PV panel 12, bottom clamp 19, (FIGS. 27, 28B, 29, 31, and 33) and bottom clamps 20, (FIGS. 27, 28A, 29, 30, and 32). When referring to a combination of FIG. 26 and other figures, reference to the steps will be from FIG. 26 and reference to structural combinations will be from the other figures.

Figure 27:
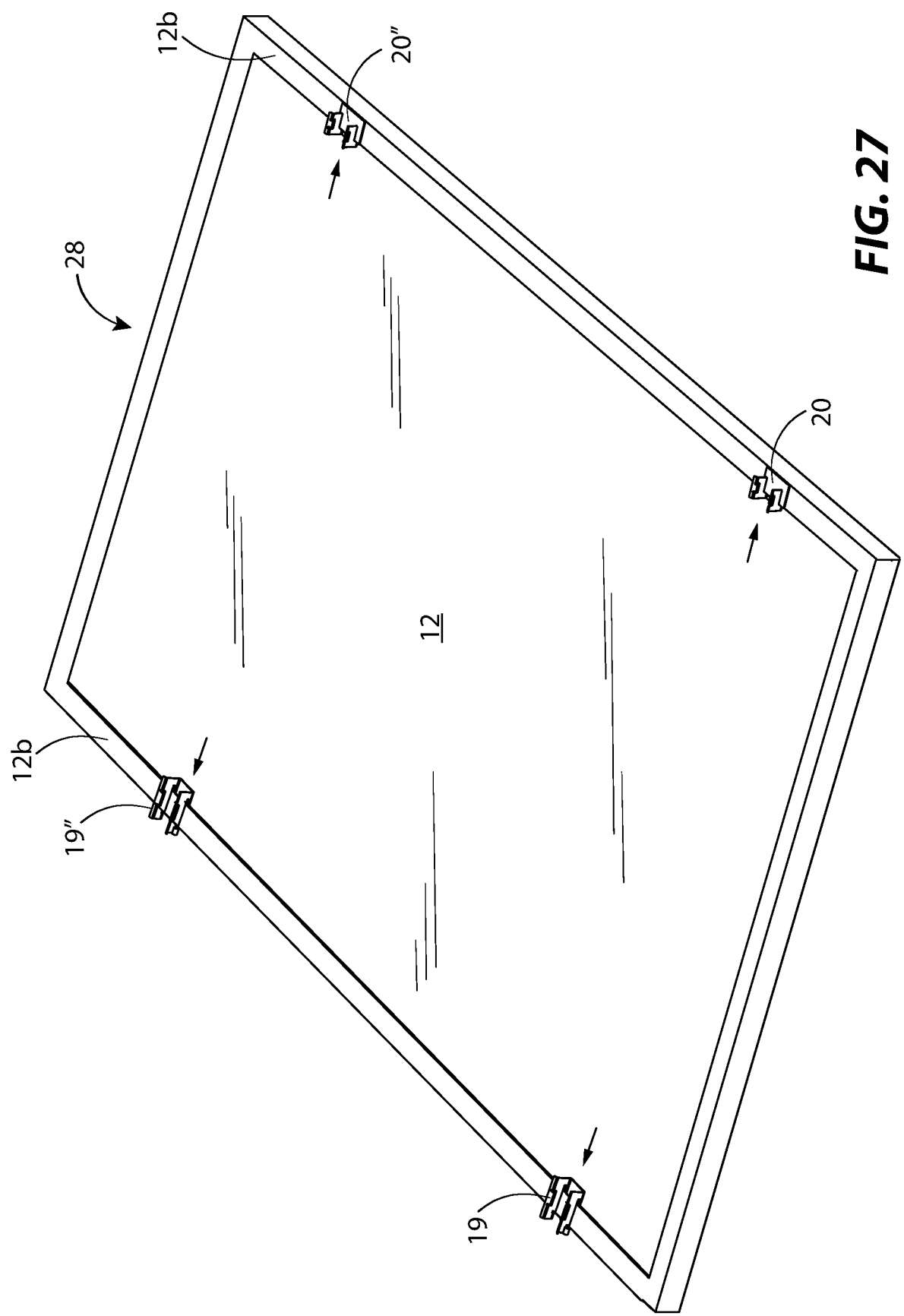
FIG. 27 illustrates, in bottom perspective view, an example of pre-assembly of the bottom clamps to the return flange of the solar panel frame.

Referring to FIGS. 26 and 27, in step 30, the bottom clamps 19, 19", 20, 20" are slid onto the solar panel return flange 12b of the solar PV panel 12 to form a solar PV panel and bottom clamp assembly 28. In FIG. 27, the solar PV panel 12 is shown upside down in order to more easily access the return flange 12b, however, the installer can face the solar PV panel 12 in any position that is convenient for them. Referring to FIG. 26, in step 31, the slots of the bottom clamps are fully inserted into the return flange. Referring FIG. 28A, the return flange 12b of the solar PV panel 12 fully engages the slots 20e, 20f (slot 20f is hidden from view) of the bottom clamp 20. Similarly, in FIG. 28B, the return flange 12b on the opposite side of the frame 12a of the solar PV panel 12 fully engages the slots 19e, 19f (slot 19e hidden from view) of the bottom clamp 19. As previously discussed, and as illustrated in FIG. 28A, the slots 20e, 20f are sized and positioned to receive the return flange 12b. Similarly, in FIG. 28B, the slots 19e, 19f are sized and positioned to receive the return flange 12b.

Figure 29:
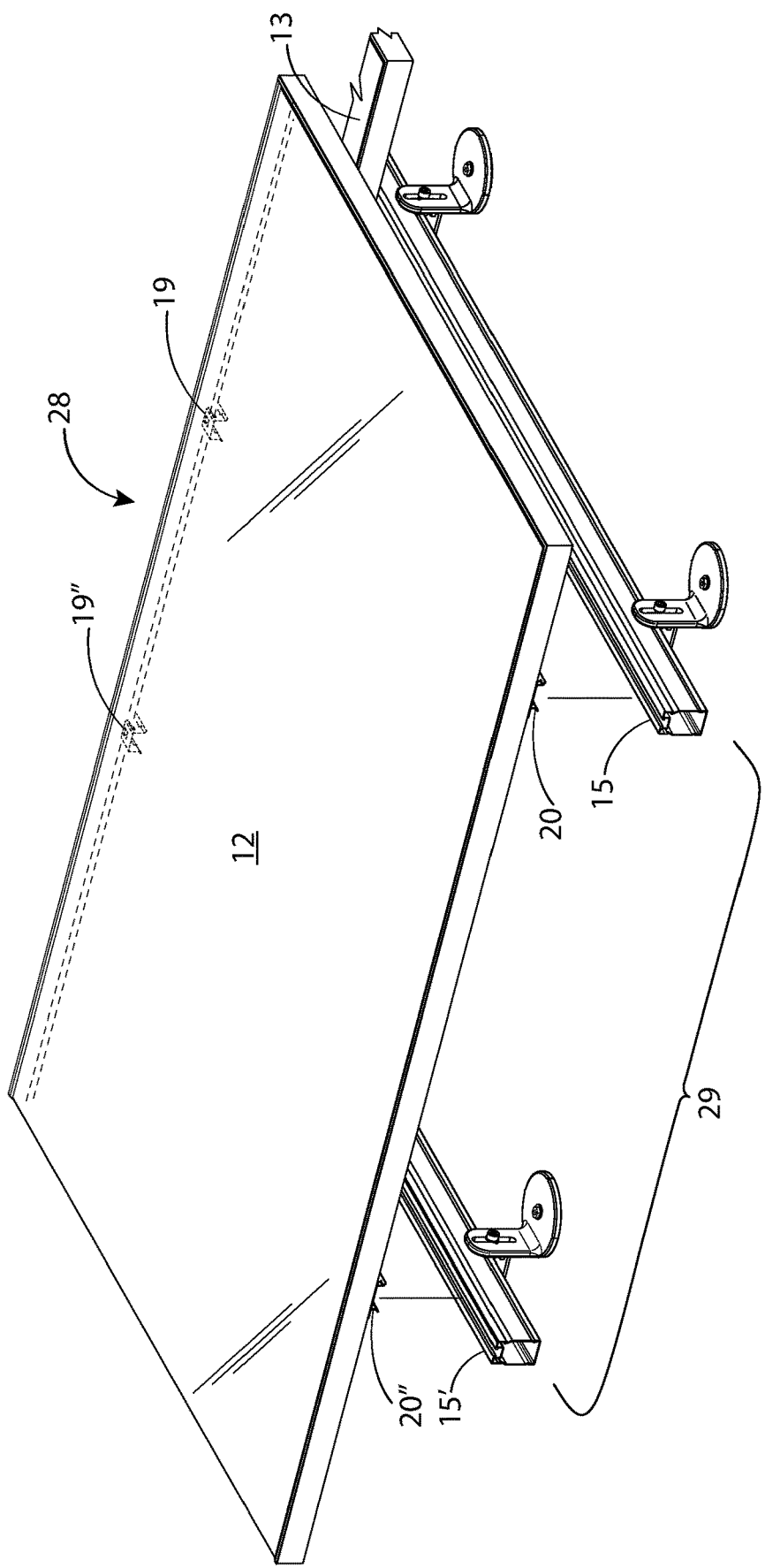
FIG. 29 illustrates, in a top isometric view, a solar PV panel and bottom clamp assembly being attached to rails.
Figure 30:
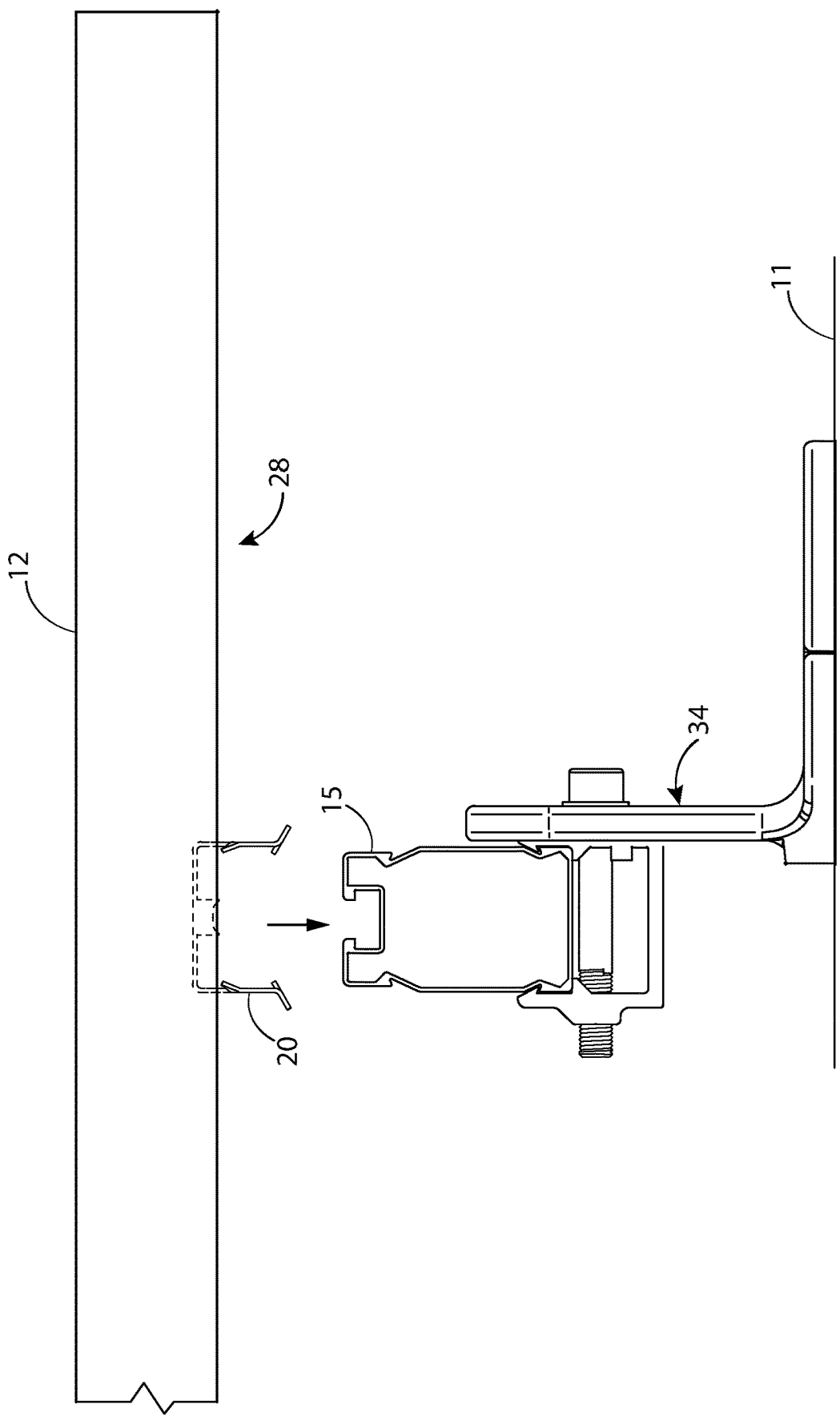
FIG. 30 illustrates, a left and side view of a portion of FIG. 29 showing the bottom clamp of FIG. 7.
Figure 31:
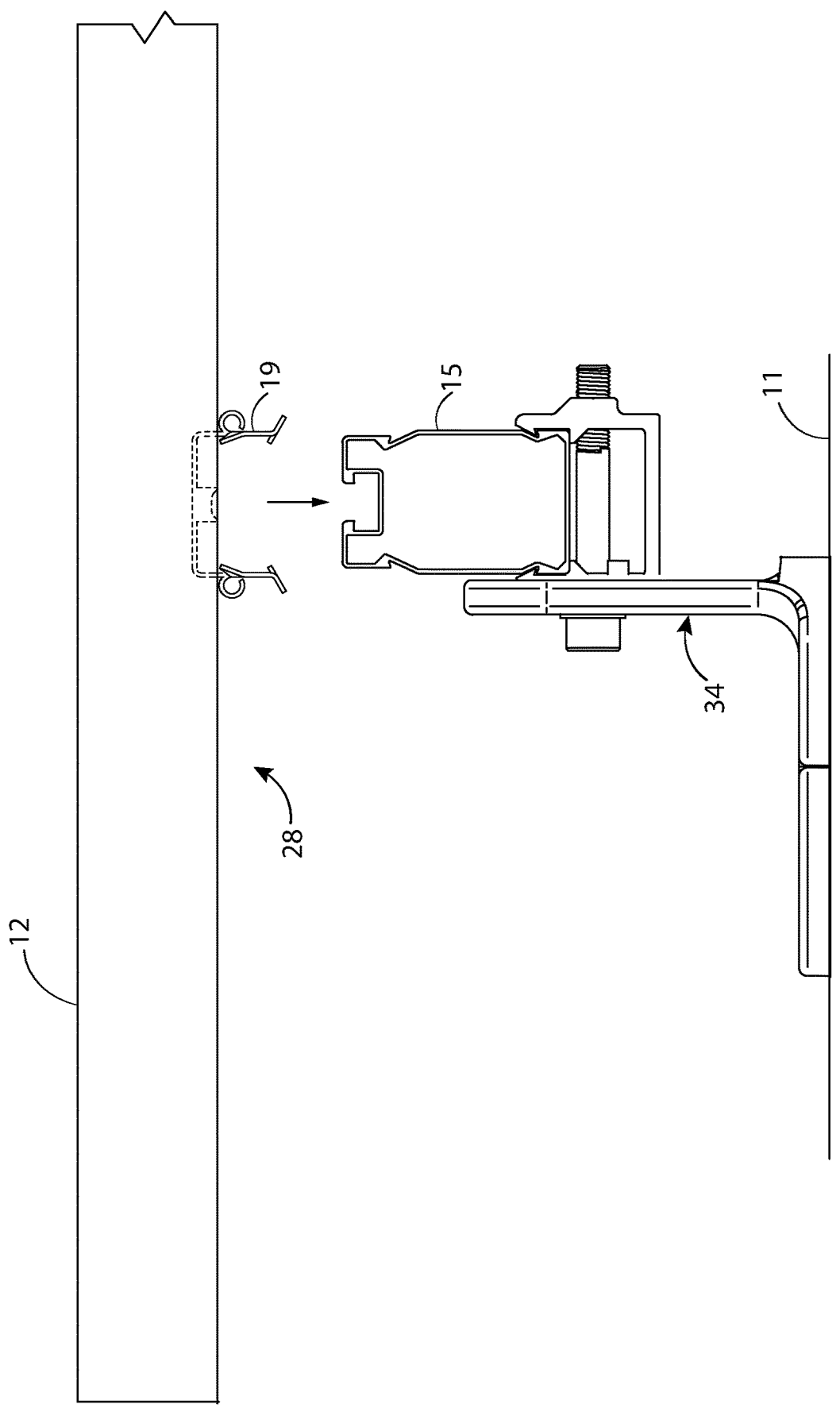
FIG. 31 illustrates, a right and side view of a portion of FIG. 29 showing the solar PV panel and bottom clamp of FIG. 3.

Referring to FIGS. 26 and 29, in step 32, the solar PV panel and the bottom clamps 19, 20 and bottom clamps 19", 20" of the solar PV panel and bottom clamp assembly 28 are aligned over rails 15, 15', respectively, of the solar panel mounting system assembly 29. In FIG. 29, the solar PV panel and bottom clamp assembly 28 includes bottom clamps 19, 19", 20, 20" and solar PV panel 12. The solar PV panel 13 is shown already secured to rail 15. FIG. 30 shows, in side view, a portion of the solar PV panel 12 and bottom clamp assembly 28 with bottom clamp 20 being aligned over the rail 15. The rail is illustrated as attached to the roof 11 by an L-foot bracket assembly 34. FIG. 31 illustrates, in side view, a portion of the solar PV panel 12 and bottom clamp assembly 28 with bottom clamp 19 being aligned over the rail 15. As with FIG. 30, in FIG. 31, the rail 15 is illustrated as attached to the roof 11 by an L-foot bracket assembly 34.

Figure 32:
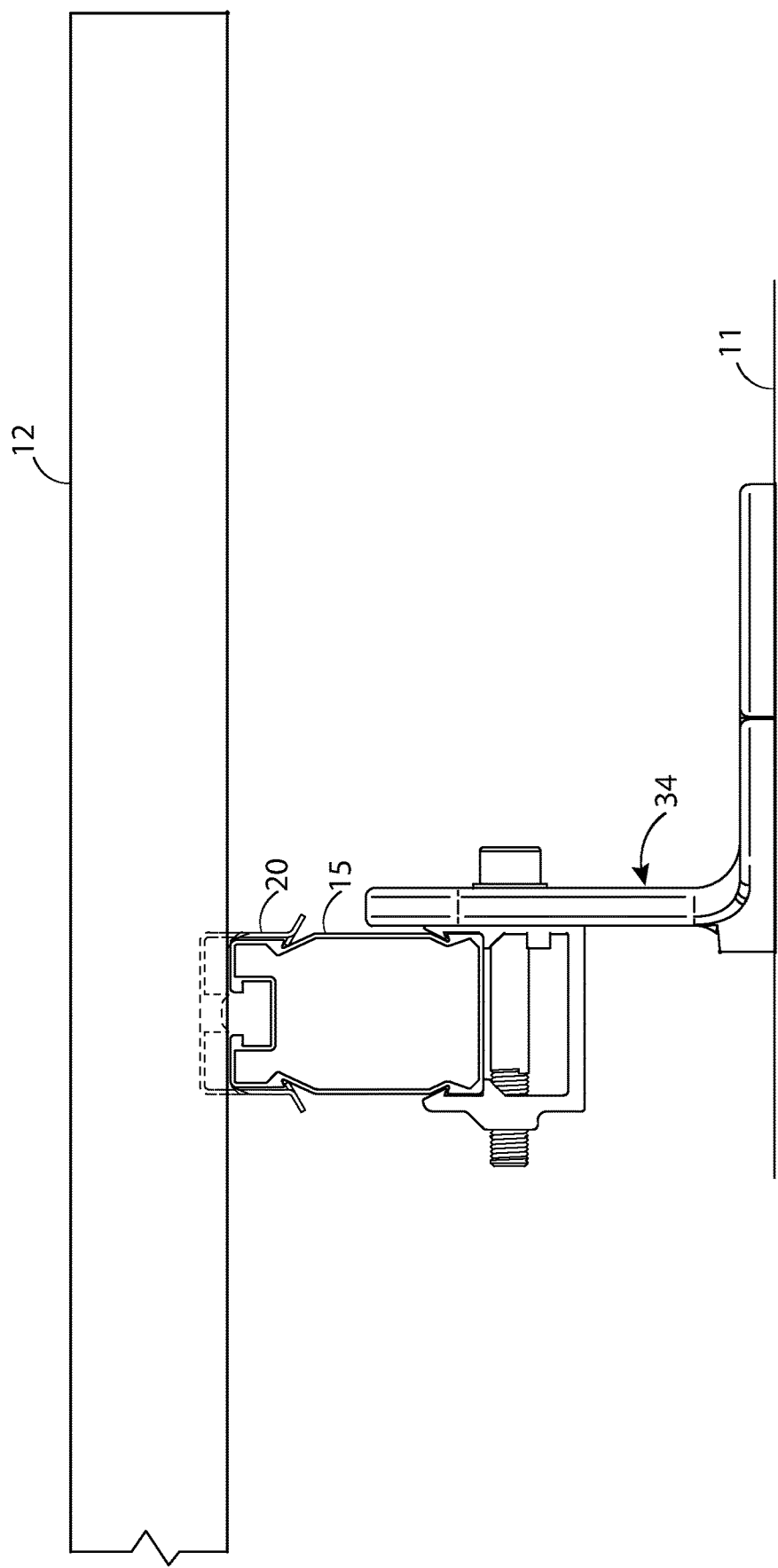
FIG. 32 illustrates, a left and side view of a portion of FIG. 29 showing the bottom clamp of FIG. 7 and the solar PV panel secured to the rail.
Figure 33:
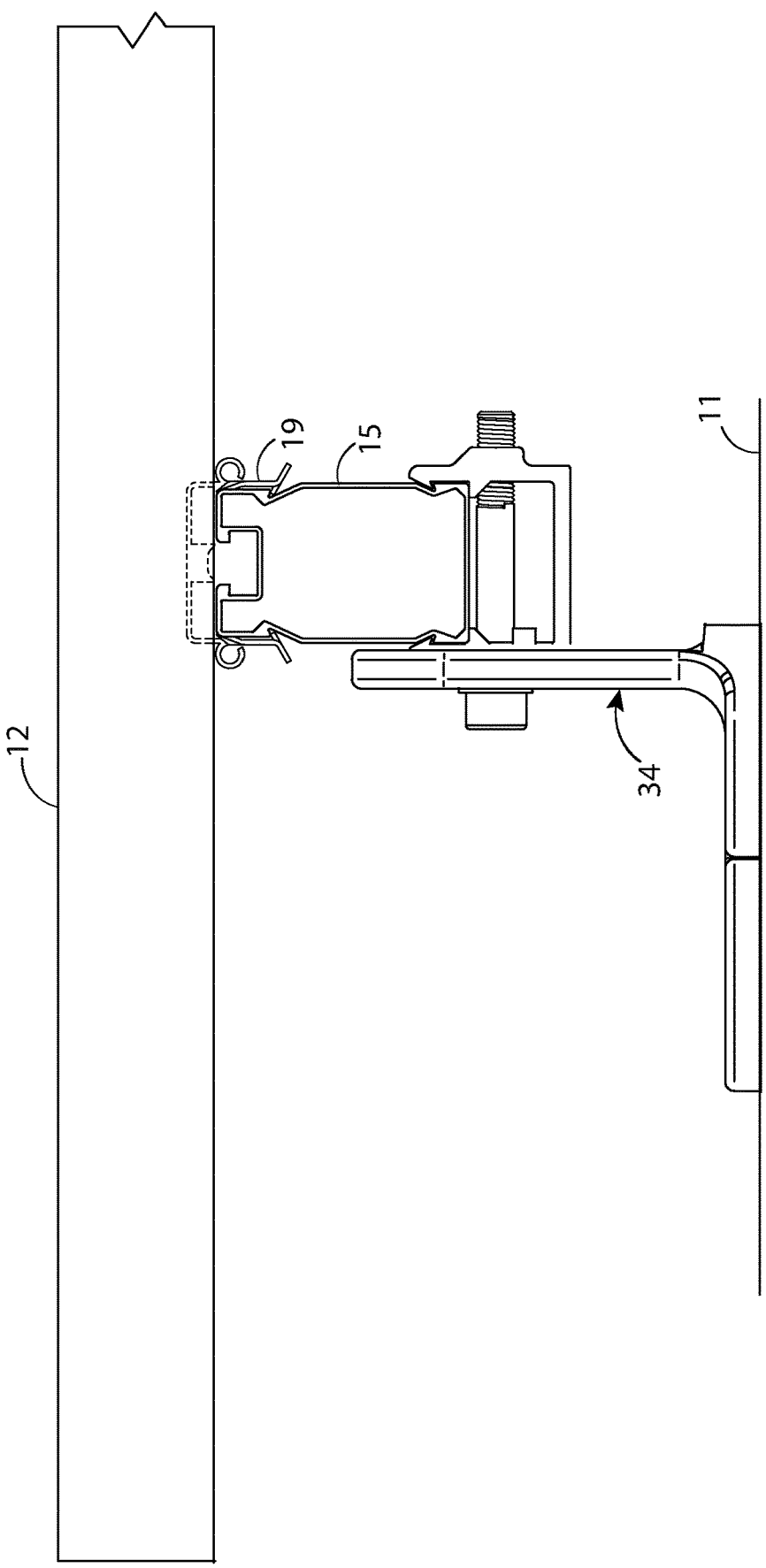
FIG. 33 illustrates, a right and side view of a portion of FIG. 29 where the bottom clamp of FIG. 3 and the solar PV panel are secured to the rail.

Referring to FIGS. 26, 31, and 32, in step 33, the bottom clamp 20 (FIG. 32) and the bottom clamp 19 (FIG. 33) are pressed on to the rail 15 until they snap into place over the rail. The solar PV panel 12, being secured to the bottom clamps 19, 20 in step 31, is thereby secured to the rail 15. Referring to FIGS. 32, 33, by virtue of the rail 15 being secured to the L-foot bracket assembly 34, the solar PV panel 12 is secured to the roof 11. As described for FIGS. 15, 16, and 20, the structure of the rail 15 and the bottom clamps 19, 20 prevents uplifting. Note the process of attaching the solar PV panel 12 to the rail 15 did not require tools. This can potentially save installation labor time and costs.

Figure 34:
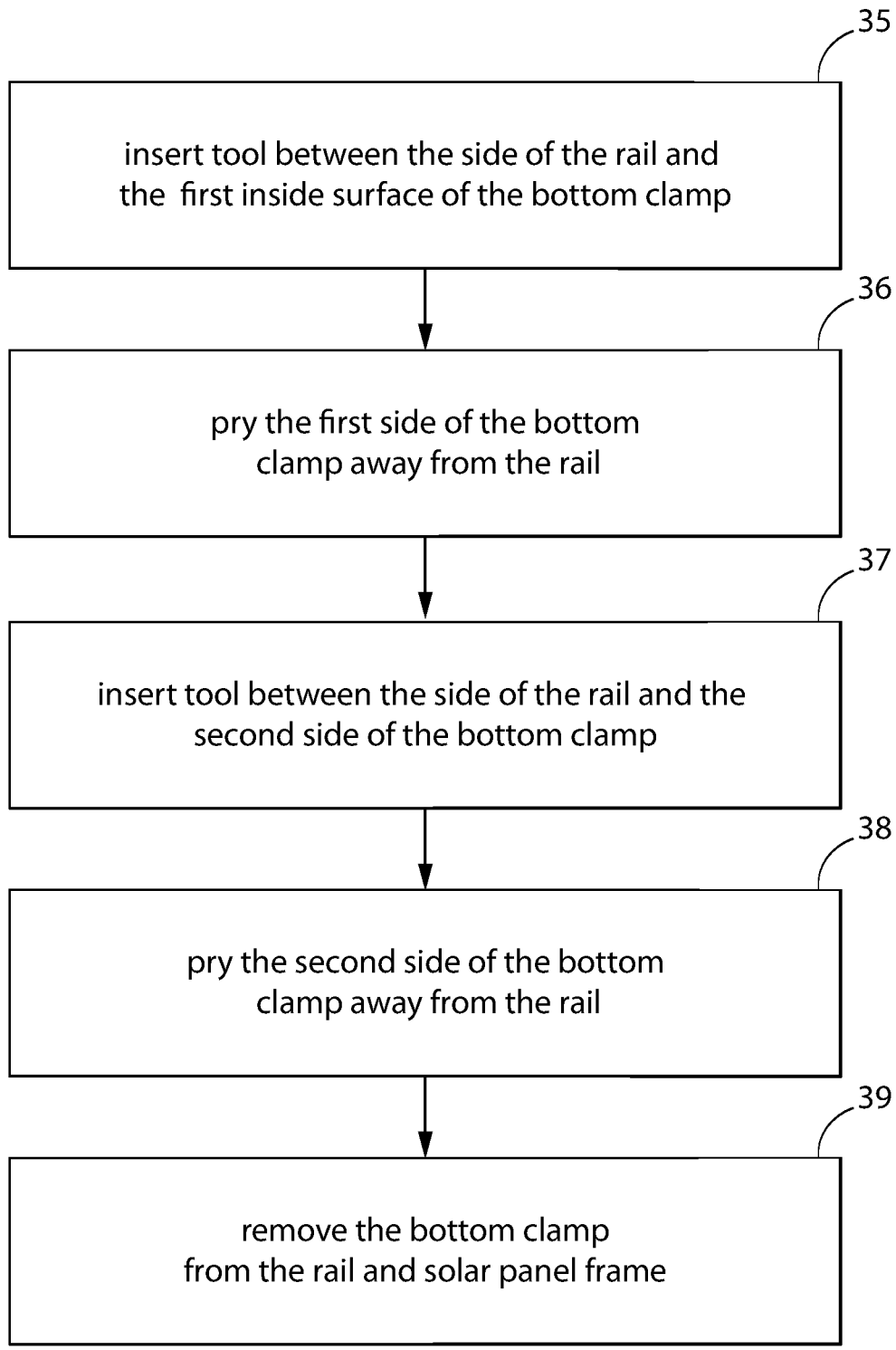
FIG. 34 illustrates, a simplified flow chart for removing the bottom clamps from the rail and solar panel frame.

FIG. 34 is a simplified flow chart for removing the bottom clamps from the solar PV panels and rails. When referring to FIG. 34 together with other figures, discussion of steps will refer to FIG. 34 and discussion of numerically-referenced structural elements refer to the other figures. FIGS. 35 and 36 illustrate removal of an end-clamp version of the bottom clamp 20 by prying a forward-positioned portion of the side 20b (FIG. 35) and side 20c (FIG. 36) of the bottom clamp 20 away from the rail 15. Dashed lines represent portions hidden from view underneath the solar PV panel 12. FIGS. 37 and 38 illustrate removal of a mid-clamp version of the bottom clamp 19 by prying between the rail 15 and spacer 19n (FIG. 37) and between the rail 15 and spacer 19o (FIG. 38) away from the rail 15. Dashed lines represent portions hidden from view underneath the solar PV panel 12 (FIG. 37) and solar PV panels 12, 13 (FIG. 38).

Referring to FIGS. 34 and 35, in steps 35, 36 a tool 41 is inserted between the side 20b of the bottom clamp 20 and the rail side 15a. Service personnel 42 uses the tool 41 to pry the side 20b and flange 20i away from the rail side 15a. Referring to FIG. 36, and steps 37 and 38, the tool 41 can be inserted between the rail side 15b and the side 20c underneath the frame 12a of the solar PV panel 12 directly adjacent to the bottom clamp 20. Service personnel 42 uses the tool 41 to pry the side 20c and flange 20j away from the rail side 15b. Note that in FIG. 36, rail side 15b, side 20c, and flange 20j are hidden from view. These are illustrated in FIG. 21.

Referring to FIGS. 34 and 37, steps 35, 36 are repeated for the bottom clamp 19. The tool 41 is inserted between the spacer 19o of the bottom clamp 19 and the rail side 15a. Service personnel 42 uses the tool 41 to pry the spacer 19o away from the rail side 15a. Referring to FIGS. 34 and 38, repeating steps 37 and 38 for the bottom clamp 19, service personnel 42 uses the tool 41 to pry the spacer 19n away from the rail side 15b. Rail side 15b is hidden from view.

Referring to FIG. 34, in step 39, once the bottom clamps are pried away from rail sides so that the tabs no longer engage the detented side portions, the solar PV panel can be lifted away from the rail. FIG. 39 illustrates the under the bottom clamp 19 with the spacers 19n, 19o pried away from rail sides 15a, 15b so that the tabs 19k, 19m no longer engage the detented side portions 15c, 15d respectively. This frees the bottom clamp 19 from the rail 15. With the bottom clamps 19", 20" of FIG. 27 similarly freed, the solar PV panel 12 of FIG. 39 can be lifted from the rail.

In FIGS. 35-38, the tool 41 is shown as a flat blade screw driver. The tool can be any tool capable of prying the sides or the spacers away from the rail sides. For example, the tool 41 could be a small pry bar or flat blade screw driver.

Referring to FIG. 38, the process can be repeated for the solar PV panel 13 that is directly adjacent to the solar PV panel 12. For example, the installer can pry the sides of the bottom clamp 19' away from the rail 15 as well as the other bottom clamps associated with solar PV panel 13 to remove it. As previously discussed, the spacers 19n, 19n' and 19o, 19o' assure that solar PV panels 12, 13 can be spaced apart a predetermined distance and uniformly without any tools or adjustment required for assembly. Only a simple flat blade tool, such as a flat blade screw driver is required for disassembly.

Devices, system, and methods for mounting solar PV panels that utilize bottom clamps have been described. It is not the intent of this disclosure to limit the claims to the examples and variations described in the specification. Those skilled in the art will recognize that variations will occur when embodying the claims in specific implementations and environments. For example, the bottom clamp 19 of FIGS. 3-6 and the bottom clamp 20 of FIGS. 7-10 are illustrated as being secured to rail 15 in FIGS. 1,2,11-15, 17-21, 29-33, and 35-39. Alternatively, the bottom clamp 19 can be used with other rails. These rails can be structured so that the tabs can move downward into a locked position and are then prevented from moving upward; for example, a rail with rail slots extending lengthwise and positioned to engage the tabs 19k, 19m of FIGS. 3-6 and tabs 20k, 20m of FIGS. 7-10. Downward movement of the bottom clamp 19 would engage the tabs 19k, 19m (FIGS. 3-6) and downward movement of the bottom clamp 20 would engage the tabs 20k, 20m into the rail slots. Once in the rail slots, they would resist upward movement.

The mid-clamp version of the bottom clamp 24 of FIGS. 22-23 and an end-clamp version of the bottom clamp 25 of FIGS. 24-25 do not have spurs. However, tabs 24k, 24m of FIGS. 22-23, and tabs 25k, 25m of FIGS. 24-25 can be modified so that they have sharpened edges. For example, the lengthwise edges the tabs could be angled inward so they form a sharpened edge. Referring to FIGS. 22 and 15 and substituting bottom clamp 24 in FIG. 22 for the bottom clamp 19 of FIG. 15, with sharpened edges, the tabs 24k, 24m could dig into detented side portions 15c, 15d, respectively of the rail 15 of FIG. 15 and create an electrically conductive path between the rail 15 and the bottom clamp 24.

"Optional" or "optionally" is used throughout this disclosure to describe features or structures that are optional. Not using the word optional or optionally to describe a feature or structure does not imply that the feature or structure is not optional.

While the examples and variations of devices, systems, and methods are helpful to those skilled in the art in understanding the claims, the scope of the claims is defined by the following claims and their equivalents.

What is claimed is:

1. A bottom clamp for mounting a solar PV panel to a rail, the solar PV panel including a frame with a return flange, the rail includes a first rail side and a second rail side, comprising:
   a top including an upper tab extending obliquely downward from the top, the upper tab sized and positioned to engage the return flange;
   a first side and a second side each extending downward from the top;
   a first tab extending obliquely upward from the first side and positioned to engage the first rail side, and a second tab extending obliquely upward and inward from the second side and positioned to engage the second rail side; and
   a first spur extending inward from the first side and sized and positioned to engage the first rail side under tension and a second spur extending inward from the second side and sized and positioned to engage the second rail side under tension.

2. The bottom clamp of claim 1, wherein:
   the first side and the second side are so structured to allow removal of the bottom clamp by prying the first side and the second side away from the rail from above and between the solar PV panel and a second solar PV panel directly adjacent therewith.

3. The bottom clamp of claim 2, wherein:
   a first spacer extending from the first side and a second spacer extending from the second side; and
   the first spacer and the second spacer are sized and positioned to space apart the solar PV panel and the second solar PV panel a predetermined distance apart.

4. A bottom clamp for mounting a solar PV panel to a rail, the solar PV panel including a frame with a return flange, the rail includes a first rail side and a second rail side, comprising:
   a top including an upper tab extending obliquely downward from the top, the upper tab sized and positioned to engage the return flange;
   a first side and a second side each extending downward from the top;
   a first tab extending obliquely upward from the first side and positioned to engage the first rail side, and a second tab extending obliquely upward and inward from the second side and positioned to engage the second rail side; and
   a first spacer extending from the first side and a second spacer extending from the second side, the first spacer and the second spacer are sized and positioned to space apart the solar PV panel and a second solar PV panel directly adjacent therewith a predetermined distance apart.

5. The bottom clamp of claim 1, wherein:
   the first side and the second side each extend perpendicularly downward from the top.

6. The bottom clamp of claim 5, wherein:
   the first side includes a first flange extending outward and downward from the first side and a second flange extending outward and downward from the second side; and
   the first tab extends obliquely upward and inward from the first flange and the second tab extends obliquely upward and inward from the second flange.

7. The bottom clamp of claim 5, wherein:
   the first side and the second side are so structured to allow removal of the bottom clamp by prying the first side and the second side away from the rail from above and between the solar PV panel and a second solar PV panel directly adjacent therewith.

8. The bottom clamp of claim 7, wherein:
   a first spacer extending from the first side and a second spacer extending from the second side; and
   the first spacer and the second spacer are sized and positioned to space apart the solar PV panel and the second solar PV panel a predetermined distance apart.

9. A bottom clamp for mounting a solar PV panel to a rail, the solar PV panel including a frame with a return flange, the rail includes a first rail side and a second rail side, comprising:
   a top including an upper tab extending obliquely downward from the top, the upper tab sized and positioned to engage the return flange;
   a first side and a second side each extending downward from the top;
   a first tab extending obliquely upward from the first side and positioned to engage the first rail side, and a second tab extending obliquely upward and inward from the second side and positioned to engage the second rail side; and
   a first slot extending lengthwise into a first edge of the first side and a second slot extending lengthwise into a second edge of the second side, the first slot and the second slot are sized and positioned to receive the return flange and align the return flange to engage the upper tab under tension.

10. The bottom clamp of claim 9 further comprising:
the first slot including a first opening into the first side and the second slot including a second opening into the second side;
a first spacer extending from the first side from below the first opening and lengthwise away from the first opening;
and a second spacer extending from the second side from below the second opening and lengthwise away from the second opening; and
the first spacer and the second spacer are sized and positioned to space apart the solar PV panel and a second solar PV panel directly adjacent therewith a predetermined distance apart.

11. The bottom clamp of claim 1, wherein:
the first spur, the second spur, and the upper tab are structured and positioned to create an electrically conductive path between the solar PV panel and the rail.

12. The bottom clamp of claim 4, wherein:
the first side includes a first flange extending outward and downward from the first side and a second flange extending outward and downward from the second side; and
the first tab extends obliquely upward and inward from the first flange and the second tab extends obliquely upward and inward from the second flange.

13. A system, comprising:
a first solar PV panel including a frame, the frame including a return flange;
a second solar PV panel directly adjacent to the first solar PV panel;
a rail including a first rail side and a second rail side;
a bottom clamp including a top with an upper tab extending obliquely downward from the top and is positioned to engage the return flange, a first side and a second side each extending downward from the top, and a first tab extending obliquely upward from the first side and positioned to engage the first rail side, and a second tab extending obliquely upward and inward from the second side and positioned to engage the second rail side; and
a first spacer extending from the first side and a second spacer extending from the second side, the first spacer and the second spacer are sized and positioned to space apart the first solar PV panel and a second solar PV panel a predetermined distance apart.

14. The system of claim 13, wherein the first rail side and the second rail side are so structured that with the first tab being engaged with the first rail side and the second tab being engaged to the second rail side, the bottom clamp resists upward movement with respect to the rail.

15. The system of claim 13, wherein:
the first rail side includes a first detented side portion and the second rail side includes a second detented side portion; and
the first detented side portion and the second detented side portion are so structured that with the first tab being engaged with the first rail side and the second tab being engaged to the second rail side, the bottom clamp resists upward movement with respect to the rail.

16. A system, comprising:
a solar PV panel including a frame, the frame including a return flange;
a rail including a first rail side and a second rail side;
a bottom clamp including a top with an upper tab extending obliquely downward from the top and is positioned to engage the return flange, a first side and a second side each extending downward from the top, and a first tab extending obliquely upward from the first side and positioned to engage the first rail side, and a second tab extending obliquely upward and inward from the second side and positioned to engage the second rail side; and
a first spur extending inward from the first side and sized and positioned to engage the first rail side under tension and a second spur extending inward from the second side and sized and positioned to engage the second rail side under tension.

17. The system of claim 16, wherein:
the first spur, the second spur, and the upper tab create an electrically conductive path between the solar PV panel and the rail.

18. The system of claim 16, wherein the first rail side and the second rail side are so structured that with the first tab being engaged with the first rail side and the second tab being engaged to the second rail side, the bottom clamp resists upward movement with respect to the rail.

19. The system of claim 16, further comprising:
a first slot extends lengthwise and creates a first opening in the first side and a second slot extends lengthwise and creates a second opening in the second side; and
the first slot and the second slot are sized and positioned to receive the return flange and align the return flange to engage the upper tab under tension.

20. The bottom clamp of claim 4, further comprising:
a first slot extends lengthwise and creates a first opening in the first side and a second slot extends lengthwise and creates a second opening in the second side; and
the first slot and the second slot are sized and positioned to receive the return flange and align the return flange to engage the upper tab under tension.

* * * * *